United States Patent Office 3,337,530
Patented Aug. 22, 1967

3,337,530
DINUCLEOSIDE 3',5'- AND 2',5'-PHOSPHATES CONTAINING ONE 7-DEAZAPURIN RIBOSIDE MOIETY
Arthur R. Hanze, Kalamazoo, Mich., assignor to The Upjohn Company, Kalamazoo, Mich., a corporation of Delaware
No Drawing. Filed Sept. 20, 1965, Ser. No. 488,724
20 Claims. (Cl. 260—211.5)

The present invention is concerned with novel organic compounds and, more particularly, with novel 3',5'- and 2',5'-dinucleoside phosphates, in which one of the nucleoside moieties is a 9-β-D-ribofuranosyl-7-deazapurin-5'-yl radical, and a process for the production thereof.

The novel compounds and the generic process can be illustratively represented by the following sequences shown in A and B wherein $R_1$ and $R_2$ alkyl radicals have from 1 to 4 carbon atoms, inclusive, or can form together an alkylene chain of 4 to 6 carbon atoms, inclusive; wherein T is selected from the group consisting of triphenylmethyl, (p-methoxyphenyl)diphenylmethyl and bis(p-methoxyphenyl)phenylmethyl, wherein X is selected from the group consisting of hydrogen, α-hydroxy and β-hydroxy; wherein Z is selected from the group consisting of hydrogen, hydroxy, amino, acylamino, in which the acyl group is of a hydrocarbon carboxylic acid containing from 2 to 12 carbon atoms, inclusive, or anisoyl, mercapto and alkylmercapto in which the alkyl group is defined as above; wherein Y is selected from the group consisting of cytosin-1-yl, uracil-1-yl, thymin-1-yl (alternatively, 5-methyluracil-1-yl), adenin-9-yl (alternatively, 6-aminopurin-9-yl), guanin-9-yl (alternatively, 2-amino-6-hydroxypurin-9-yl), 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyluracil-1-yl, hypoxanthin-9-yl (alternatively, 6-hydroxypurin-9-yl), xanthin-9-yl (alternatively, 2,6-dihydroxypurin-9-yl), 5-methylcytosin-1-yl, 3-methylcytosin-1-yl, 2,6-diaminopurin-9-yl, 5-hydroxymethylcytosin-1-yl, 7-deazaadenin-9-yl, 6-mercapto-7-deazapurin-9-yl, 7-deazahypoxanthin-9-yl, 6-azauracil-1-yl; and wherein Y' signifies a group like Y in which substituents capable of acylating, e.g., amino groups, are also acylated and thus protected from reacting with the phosphate esters.

Thus, Y' is selected from the group consisting of $N^4$-acylcytosin-1-yl, uracil-1-yl, thymin-1-yl, $N^6$-acyladenin-9-yl, $N^2$-acylguanin-9-yl, 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyluracil-1-yl, hypoxanthin-9-yl, xanthin-9-yl, $N^4$-acyl-5-methylcytosin-1-yl, $N^4$-acyl-3-methylcytosin-1-yl, $N^2,N^6$-bis(acylamino)purin-9-yl; $N^4$-acyl-5-O-acyloxymethylcytosin-1-yl, $N^6$-acyl-7-deazaadenin-9-yl; 6-mercapto-7-deazapurin-9-yl; 7-deazahypoxanthin-9-yl; and 6-azauracil1-yl, wherein the acyl group is defined as hereinabove.

A.

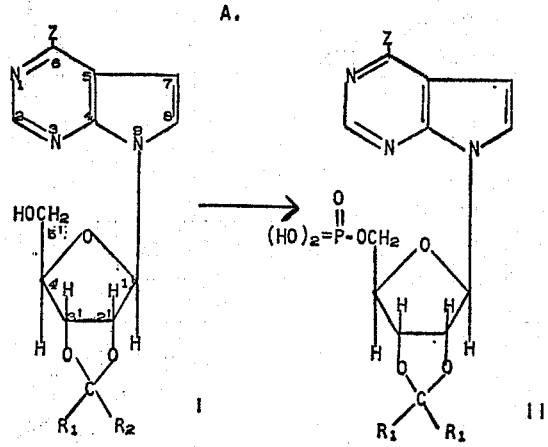

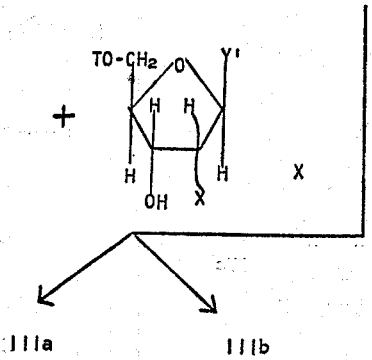

IIIa           IIIb

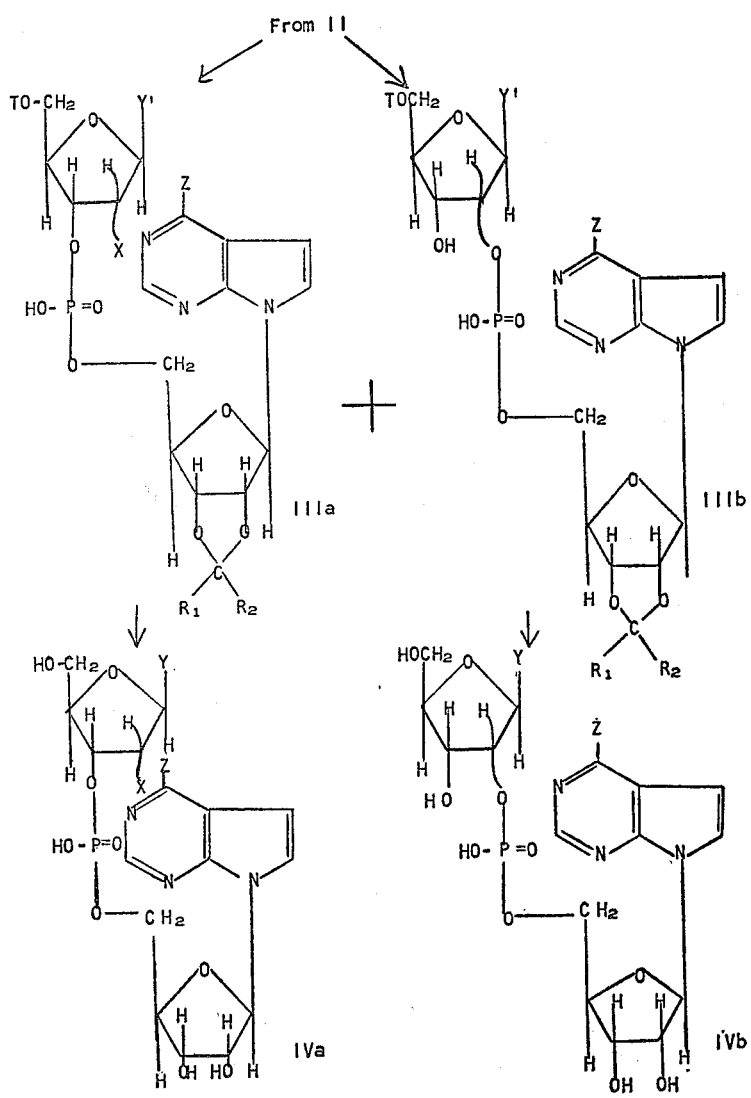
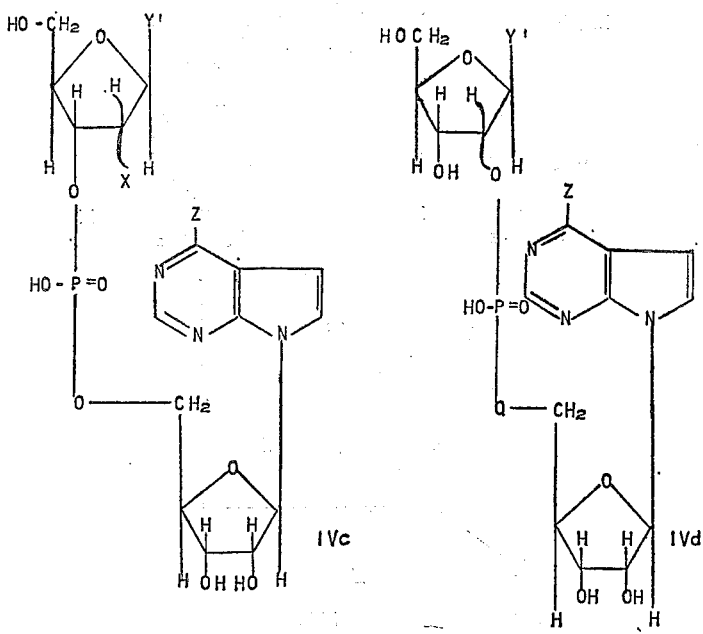

(B) Preparation of the intermediates (X) for the phosphorylation in positions 2'–O or 3'–O.

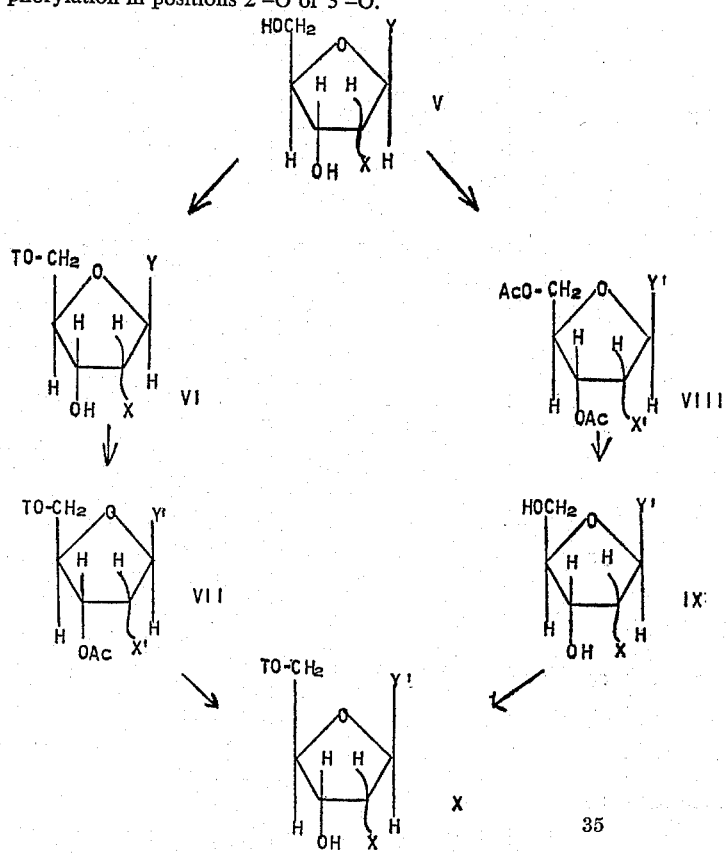

wherein T, X, Y and Y' are defined as hereinabove; wherein Ac is an acyl group defined as hereinabove and wherein X' is selected from the group consisting of hydrogen, β–OAc and β–OAc wherein Ac is an acyl group defined as above. Obviously when X is H, i.e., compound V is a 2-deoxyribofuranoside and when simultaneously Y in compound V cannot be acylated, compound X is obtained by simply etherifying V with a suitable triphenylhalomethane in the manner shown subsequently, i.e. compound VI and X are alike.

The vertical wavy line $\wr$ with substituents at both ends is used to indicate that the substituents can be in α-(below the plane of the ring) or in the β-position (above the plane of the ring).

Examples of acyl groups of hydrocarbon carboxylic acid, as herein used, include acetyl, propionyl, butyryl, valeryl, isovaleryl, hexanoyl, heptanoyl, octanoyl, nonanoyl, decanoyl, undecanoyl, lauroyl, benzoyl, phenylacetyl, phenylpropionyl, p-toluoyl, β-cyclopentylpropionyl, and the like.

The heterocyclic radicals Y are obtained when a hydrogen atom is removed from the parent compound at the position indicated by the number prior to the ending "-yl." The radicals Y have therefore the following formulae:

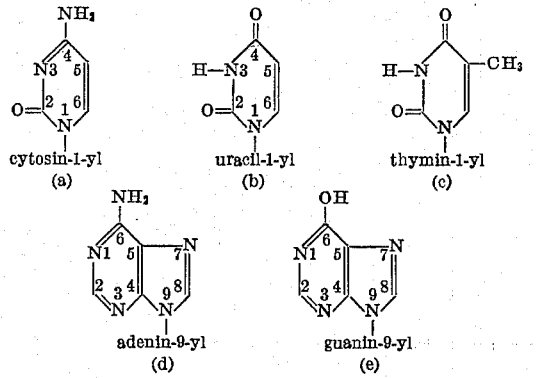

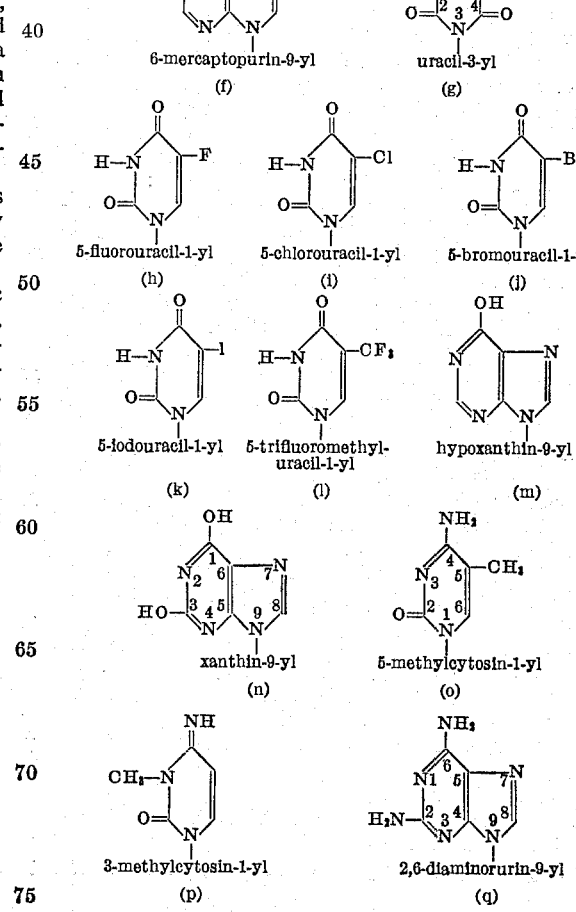

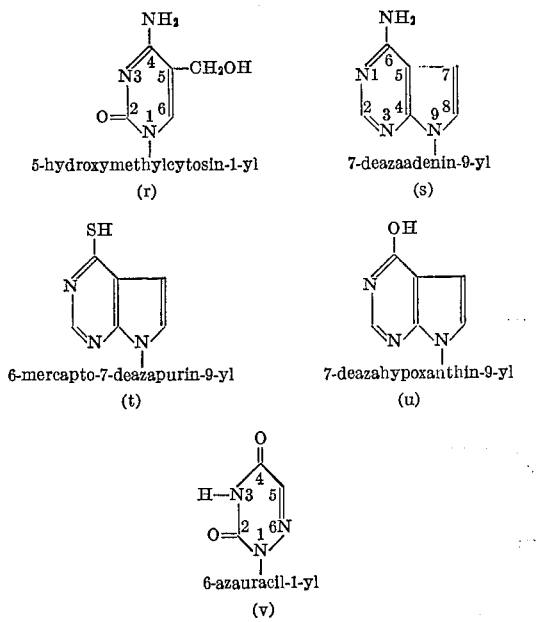

5-hydroxymethylcytosin-1-yl (r)

7-deazaadenin-9-yl (s)

6-mercapto-7-deazapurin-9-yl (t)

7-deazahypoxanthin-9-yl (u)

6-azauracil-1-yl (v)

The above compounds, e.g., uracil (b) and substituted-uracil radicals (c), (g), (h), (i), (j), (k) and (l) are written in the keto form, rather than in the tautomeric enol form. Likewise, other of the above radicals can be written in tautomeric form. For example, the cytosine and substituted-cytosine radicals (a) and (o) are written in the amino form, but they can also be written in the tautomeric imino form. In chemical compounds, e.i., the compounds of this invention, such forms may frequently be present in an equilibrium mixture.

The process of the present invention is essentially designed to protect those positions in the heterocyclic moiety as well as in the sugar moiety of the molecule which can react with phosphoric acid or the phosphorylating agent and leave at the same time the desired positions 2′ or 3′ and 5′, open to react with the phosphorylating agent. While the process can therefore slightly vary, depending on the selected nucleoside and protecting agent, the basic process can be described as shown in the before-disclosed sequence of formulae, in the following manner:

A 9-(2′,3′-di-O-isopropylidene-β-D-ribofuranosyl)7-deazapurine of Formula I is treated with a phosphorylating agent, for example, 2-cyanoethyl phosphate in the presence of a condensing agent and thereafter a base to give the corresponding 9-(2′,3′-di-O-isopropylidene-β-D-ribofuranosyl)7-deazapurine 5′-phosphate: Compound II is treated under anhydrous conditions with a nucleoside 5′-ether of Formula X in the presence of a condensing agent such as dicyclohexylcarbodiimide to give a dinucleoside phosphate of Formula IIIa, when (X=H) or a mixture of nucleosides IIIa and IIIb (when X=OH).

The products can be hydrolyzed sequentially with acid and base, or with acid only giving, depending on the starting material selected and on the type of hydrolysis selected, the final products IVa, IVb, IVc and IVd. The acid will remove the ether-(trityl and p-methoxy-substituted trityl)groups and the acetal group. The base will remove N-acyl groups of amino substituted nucleosides.

The novel dinucleoside phosphates of Formulae IVa, IVb, IVc and IVd exhibit significant cytotoxic activity in vitro, particularly against different types of Herpes, Coe and Vaccinia viruses. For this reason, the products can be employed for cleansing glassware and instruments used in the growing of tissue cultures for virus and tumor research, washing excised tumor tissue, intended for transplant into animals, to inhibit the growth of any KB tumor cells that might otherwise seed surrounding tissues, or be transported to other parts of the body. The antiviral activity can also be used to prepare fungal and bacterial cultures, uncontaminated by viral phages, e.g., phage-free antibiotic producing Streptomyces cultures.

The compounds of Formulae IVa and IVb are also active against bacteria and fungi and can be used to cleanse instruments and glassware contaminated by bacterial or fungal growth. The present compounds are furthermore of interest in as much as they are chemically closely related to adenosine which is one of the building blocks of ribonucleic acids, which in turn control protein syntheses and all genetic information contained in the cells.

The starting materials of Formulae I and X are produced as shown further in the preparations. In carrying out the process of the present invention a 7-deazapurinyl-ribofuranoside in which the hydroxy group on the 2′ and 3′ carbon atoms are protected by a cyclic acetal formation (I) is phosphorylated by the method of G. M. Tener, J. Am. Chem. Soc. 83, 159 (1959). Solvents used in this procedure are anhydrous, non-hydroxylic solvents in which the phosphorylating agent, a phosphate ester, is also soluble. Such solvents are pyridine, picoline, lutidine, or the like. Neutral solvents such as dimethyl sulfoxide, tetrahydrofuran, N,N-dimethylacetamide or dioxane can be used, providing that for each mole of phosphorylating agent one equivalent of basic reagent, e.g., pyridine, is added. Other representative bases for this reaction include picolines, lutidines or trialkylamines.

Phosphate esters, which are readily cleaved by a strong base, e.g., an alkali metal hydroxide, are employed, and particularly useful for this reaction are 2-substituted ethyl dihydrogen-phosphates of the formula:

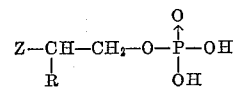

wherein R is selected from the group consisting of hydrogen and lower alkyl, wherein Z is a strongly electronegative substituent selected from the group consisting of

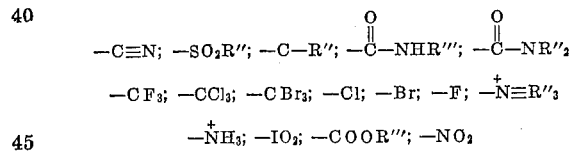

and the like; wherein R″ is selected from the group consisting of lower alkyl and aryl, and wherein R‴ is selected from the group consisting of hydrogen, lower alkyl and aryl. The preferred 2-substituted-ethyl dihydrogenphosphate is 2-cyanoethyl dihydrogenphosphate.

Instead of a 2-substituted ethyl dihydrogenphosphate, other dihydrogenphosphate esters which are easily cleaved by a base may be used, for example, o- and p-substituted-phenyl dihydrogenphosphates, such as O- and p-carboxyphenyldihydrogenphosphate, o- and p-carbamoylphenyl dihydrogenphosphate, and o- and p-cyanophenyl dihydrogenphosphate.

In the solution containing the β-substituted-ethyldihydrogenphosphate or o- or p-substituted-phenyl dihydrogenphosphate, the before-mentioned 2′,3′-O-alkylidene protected ribofuranosyl-7-deazapurine was dissolved, if necessary under application of heating between 30 to 50° C. After all the 9-(2′,3′-di-O-alkylidene-β-D-ribofuranosyl)7-deazapurine compound I had been dissolved, a condensing agent is added such as an alkyl- or aryl-substituted carbodiimide, preferably dicyclohexylcarbodiimide. Other compounds unrelated to carbodiimides which can be used as reagents are p-toluenesulfonyl chloride, methoxyacetylene, keteneimines, trichloroacetonitrile, substituted cyanamides, α-substituted acetonitriles, alkyl- and aryl-isocyanates, carboxylic acid chlorides, aralkyl chlorocarbonates and the like.

The preferred temperatures for this reaction are those temperatures around and slightly above room temperature, that is, temperatures between 20 and 40° C.; however, the reaction can be carried out at lower temperatures, such as 5° C. and up to temperatures of about 75° C. without undue side-reactions. At a temperature between 20 and 40° C. and at reasonable concentration, the time required for the reaction to be completed is about 4 to 72 hours. However, reaction times between 1 hour and 8 days can be used; the reaction time should be significantly prolonged at greater dilution.

The concentration of the reactants is not critical. Equimolecular amounts of 9-(2′,3′-di-O-alkylidene-β-D-ribofuranosyl)-7-deazaadenine compound I, the 2-substituted ethyl phosphate and the base catalyst, give approximately quantitative conversion, if sufficient time is allowed for the reaction to be completed. In order to shorten the time of reaction, a 3 to 4 times molar excess of the 2-substituted ethyl dihydrogenphosphate over 9 - (2′,3′ - di - O-alkylidene-β-D-ribofuranosyl)-7-deazaadenine compound is preferred. After the reaction is terminated, a small amount of water is added to inactivate the excess of phosphorylating reagent and of the condensing agent. The solution is then filtered to remove insoluble material such as the disubstituted ureas resulting from the reaction of carbodiimides with water, and the filtrate is used for the next step, the cleavage reaction.

The solution obtained from the prior step is reacted with an aqueous alkali hydroxide solution to produce the desired cleavage. In the preferred embodiment of the invention the solution containing the 9-(2′,3′-di-O-alkylidene-β-D-ribofuranosyl)-7-deazapurin-5′-yl 2-cyanoethyl phosphate is first concentrated until a small volume is obtained, concentration being usually achieved under vacuum. When the volume is low enough so that the cooled material becomes a viscous residue, a base, e.g., aqueous lithium, sodium or potassium hydroxide of a 0.4 to 2 normality, is added until the pH of the solution rises between 12 to 13 at a low temperature between −10 to +20° C. If the reaction is carried out under vigorous conditions, higher temperature or longer periods, then a compound II is obtained in which the base substituent Z is not acylated, if it was acylated before. After termination of the reaction, the mixture is cooled and filtered. From the filtrate the product II is recovered by conventional methods such as extraction, evaporation, precipitation in the form of insoluble phosphate salts, absorption and desorption on resins, recrystallization and the like.

The thus-obtained 9 - (2′,3′ - O - alkylidene-β-D-ribofuranosyl)-7-deazapurine 5′-phosphate (II) is thereupon condensed with a furanosyl 5′-ether of Formula X. In the preferred embodiment of this invention, the condensation is carried out with equimolecular amounts of the two compounds II and X in anhydrous pyridine in the presence of a condensing agent such as dicyclohexylcarbodiimide at room temperature, i.e. at about 25° C. Instead of pyridine as solvent, alkyl-substituted pyridines such as α-, β-, or γ-methylpyridine, disubstituted alkylpyridines, and trisubstituted alkylpyridines, dimethylformamide, diethylformamide, and the like can be used. The reaction can be carried out at temperatures between 0 to 115° C., but room temperature, between 20 to 30° C., is preferred. The reaction period is between 4 hours to 10 days. Other dialkylcarbodiimides and dicyclolalkylcarbodiimides such as dimethylcarbodiiminde, diethylcarbodiimide, dibutylcarbodiimide, dicyclopentylcarbodiimide, and the like are useful for this condensation. The product thus obtained is a 3′,5′-dinucleoside phosphate of Formula IIIa (if X is hydrogen), or a mixture of 2′,5′- and 3′,5′-dinucleoside phosphates of Formula IIIa and IIIb, if X in Formula X was OH. The product or products can be isolated by conventional methods, particularly by extracting impurities with a water-immiscible solvent, e.g., petroleum ether, benzene, Skellysolve B hexanes, carbon tetrachloride, methylene chloride, ether, and by lyophilizing the remaining aqueous reaction mixture. Extraction and lyophilization is often repeated to rid the aqueous reaction mixture of volatile by-products. Products IIIa and IIIb can be separated from each other by standard methods, particularly chromatography with the aid of ion exchange resins, solvent extraction in a Craig apparatus, continuous flow electrophoresis and the like, and can be further purified by standard methods, e.g., recrystallization, paper chromatography and high voltage electrophoresis.

The thus-obtained products IIIa and IIIb individually or as a mixture are hydrolyzed to remove the isopropylidene group and the 5′-trityl ether group with an aqueous acid. The acid can be a mineral acid such as aqueous dilute sulfuric acid, hydrochloric, hydrobromic, hydroiodic or other acids or can be an organic acid such as formic, aqueous formic, aqueous acetic, aqueous propionic acid or the like, or can be an acid exchange resin. If aqueous mineral acids are used, common solvents for the product and the acids are also preferred such as ethanol, methanol, acetone, dioxane or the like. In the preferred embodiment of this invention, aqueous acetic acid, particularly a mixture containing about 80% acetic acid and 20% water are used.

In addition to the acid hydrolysis, either prior or after, a base hydrolysis may also be carried out to remove any acyl groups from the possible amino groups of the N-heterocyclic portion of the individual nucleosides. For the basic hydrolysis, lithium, sodium, potassium or barium hydroxide, preferably in methanol or ethanol or an alcoholic solution saturated with ammonia is used. Details of these hydrolyses are given in the subsequent examples. In this manner the end products IVa and IVb are obtained, which if not already separated, can be separated by conventional means, such as those discussed for the separation of compounds IIIa and IIIb, above.

The following preparations and examples are illustrative of the products and processes of the present invention, but are not construed as limiting.

PREPARATION 1

$N^6$-benzoyl-2′-3′-O-isopropylidenetubercidin

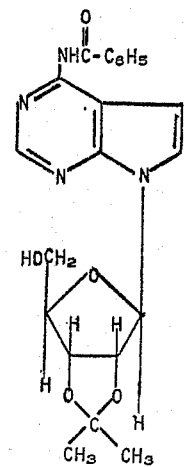

[$N^6$-benzoyl-9-(2′,3′-O-isopropylidene-β-D-ribofuranosyl)-7-deazaadenine]

(A) *Production of sparsomycin A (tubercidin) by fermentation*

A soil slant of *Streptomyces sparsogenes* var. *sparsogenes*, NRRL 2940, was used to inoculate a series of 500-ml. Erlenmeyer flasks each containing 100 ml. of seed medium consisting of the following ingredients:

| | |
|---|---|
| Glucose monohydrate | g.— 25 |
| Pharmamedia[1] | g.— 25 |
| Tap water q.s. | l.— 1 |

[1] Pharmamedia is an industrial grade of cottonseed flour produced by Traders Oil Mill Co., Fort Worth, Tex.

The seed medium presterilization pH was 7.2. The seed was grown for 2 days at 28° C. on a Gump rotary shaker operating at 250 r.p.m.

One shake flask of the seed described above (100 ml.) was used to inoculate a 20 liter seed tank containing 15 l. of the above sterile seed medium (S-1) plus 1 ml./l. of lard oil. The seed tank was grown for 24 hours at a temperature of 28° C., aeration rate of 10 standard l./min., and agitated at a rate of 400 r.p.m.

The seed tank, described above, was then used to inoculate a 380-l. fermentor containing 250 l. of the following sterile medium:

| | |
|---|---|
| Glucose monohydrate | g./l. 10 |
| Dextrin | g./l. 15 |
| Pharmamedia | g./l. 20 |
| Wilson's Peptone Liquor No. 159 [2] | g./l. 5 |
| Lard oil | ml./l. 2 |
| Tap water | Balance |

[2] Wilson's Peptone Liquor No. 159 is a preparation of hydrolyzed proteins from animal origin.

The fermentation then proceeded for 113 hours during which time the temperature was controlled at 28° C., filtered air supplied at a rate of 100 standard l./minute, and agitation at 28 r.p.m. During the course of the fermentation, 1850 ml. of lard oil was added as an antifoam.

(B) *Recovery of sparsomycin A*

The whole beer from the above fermentation was adjusted from the harvested pH of 7.1 to pH 2.4 with 350 ml. of sulfuric acid (concentrated) and filtered using 3.6% diatomaceous earth as filter aid. The filter cake was washed with 0.2 volume of deionized water, the clear beer plus wash (vol. 280 l.) was adjusted to pH 7.35 with 300 ml. of 50% aqueous sodium hydroxide and allowed to stand overnight at 10° C. The clear beer was then adjusted to pH 8 with 50 ml. of 50% aqueous sodium hydroxide and stirred for 1 hour with 1% decolorizing carbon and 3% diatomite. The mixture was filtered and the carbon cake washed with 0.2 volume of 20% aqueous acetone. The washed carbon cake was eluted twice with 0.4 volume of 50% aqueous acetone, acidified to pH 2.5 with concentrated sulfuric acid, and the eluates pooled. The pooled acetone eluate (72 l.) was adjusted to pH 6.4 with 30 ml. of 50% aqueous sodium hydroxide and concentrated to an aqueous solution (40 l.). The concentrate was adjusted to pH 5.9 and freeze-dried to give 447 g. of lyophilized material.

An additional 1126 g. was obtained by twice repeating the above fermentation and recovery. The combined lyophilized material (1573 g.) was slurried in 10 l. of methanol at 40° C. for 1 hour. Insoluble material was filtered off and washed 3 times with 500 ml. of warm methanol (40° C.). The methanol extracts and washes were combined (11.5 l.) and concentrated in vacuo to a dry preparation weighing 321 g. (HrV-25.3) and assaying 1.25 *Proteus vulgaris* biounits/mg.

(C) *Purification of Sparsomycin A*

*Partition Column.*—300 g. of the above preparation (HRV-25.3) was placed in a partition column which was prepared and developed in the following manner. A solvent system was made using equal volumes (350 l.) of McIlvaine's pH 6.0 buffer and methyl ethyl ketone. A slurry containing 9.6 kg. of diatomite in 60 l. of upper phase and 4.8 l. of lower phase of the above-described solvent system was poured into a 12" column and packaged with 4 p.s.i.g. of nitrogen. The column feed was dissolved in 3 l. of lower phase, slurried with 1920 g. of diatomite and enough upper phase added to make it mobile. The feed was carefully added to the top of the column bed which was covered with a layer of sea sand. The column was eluted with upper phase solvent at a rate of 2 l./minute. 4-l. fractions were collected except at the beginning and end of the column when 20-l. fractions were collected. The fractions were concentrated and bio-activities observed on *P. vulgaris* trays. At this point in the process the separation of sparsomycin and sparsomycin A was effectuated. Further processing purified these components and ultimately resulted in crysalline material.

Fractions 24-34, inclusive, from the above partition column contained the sparsomycin (9-β-D-ribofuranosyl-7-deazaadenine) component.

*Purification of sparsomycin A.*—The sparsomycin A component was purified and crystallized in the following manner. Fractions 11-20, inclusive, from the previously described partition column—part C— contained the sparsomycin A component. These fractions were pooled and concentrated under reduced pressure and 7.2 g. of crystalline material was isolated. These crystals were dissolved in 400 ml. of water and 50 ml. of 0.1 HCl. The solution was heated gently to facilitate dissolving and then filtered. The clear solution was adjusted to pH 9.0 with 50% aqueous sodium hydroxide and chilled in the refrigerator for 5 hours. The crystals were collected by filtration, washed with water, and dried to give 5.65 g. of preparation ADA-102.1. 2 g. of this preparation were then dissolved in 75 ml. of water and 20 ml. of 0.1 N HCl. This clear solution was adjusted to pH 9.0 with 50% aqueous sodium hydroxide. Crystallization started immediately. The solution was left at 25° C. for 7 hours and then the crystals were collected, washed with 25 ml. of water, and dried to yield 1.52 g. of preparation ADA-105.1 having a melting point of 247.8-250° C., an optical rotation $[\alpha]_D^{25} -62°$ (c.=0.718 in 0.1 N HCl), an equivalent weight of 269, pKa' of 5.07 in water, an ultraviolet absorption spectrum in

| | |
|---|---|
| Water | 270 mμ, a=44.14 |
| 0.01 N $H_2SO_4$ | 227 mμ, a=85.28 |
| | 271 mμ, a=40.82 |
| 0.01 N KOH | 270 mμ, a=43.50 | a characteristic IR absorption at the following frequencies expressed in reciprocal centimeters

| | |
|---|---|
| 3350 (S) | 1198 (W) |
| 3250 (S) | 1160 (W) |
| 3145 (S) | 1134 (M) |
| 3095 (S) (sh) | 1120 (M) |
| 2880 (S) (oil) | 1093 (M) |
| 2810 (S) (oil) | 1080 (W) |
| 1895 (W) | 1055 (M) |
| 1640 (S) | 1042 (S) |
| 1592 (S) | 1017 (S) |
| 1552 (M) | 992 (S) |
| 1502 (M) | 953 (W) |
| 1475 (M) | 912 (W) |
| 1458 (S) (oil) | 903 (M) |
| 1445 (M) (sh) | 867 (M) |
| 1426 (M) | 852 (W) |
| 1370 (M) (oil) | 842 (W) |
| 1351 (M) | 799 (W) |
| 1306 (M) | 715 (W) |
| 1276 (W) | 704 (S) |
| 1255 (S) | 675 (M) |
| 1241 (M) | 658 (M) | and the following elemental analysis:

*Analysis.*—Calcd. for $C_{11}H_{14}N_4C_4$: C, 49.62; H, 5.30; N, 21.04. Found: C, 49.81; H, 5.20; N, 20.92.

9-β-D-ribofuranosyl-7-deazaadenine (sparsomycin A) was also isolated and purified from fermentation broth in another manner. The fermentation was carried out as described above under A. The whole beer (AJW-63) was adjusted to pH 2.5 with 365 ml. of concentrated sulfuric acid and filtered using 6% diatomaceous earth as filter aid. The filter cake was washed with 0.1 volume of deionized water and the wash added to the clear beer. The clear beer was then adjusted to pH 8.0 with 400 ml. of 50% aqueous sodium hydroxide and stirred 1 hour with 1% decolorizing carbon and 3% diatomite. The mixture was filtered and the carbon cake washed with 0.1 volume of deionized water followed by 0.2 volume of 20% aqueous acetone. The washed carbon was eluted twice with 0.4 volume of 40% aqueous acetone which had been acidified to pH 2.5 with concentrated sulfuric acid, and the eluates were pooled. The pooled acetone eluates were then adjusted to pH 4.8 with 53 ml. of 50% aqueous sodium hydroxide, concentrated to an aqueous solution and freeze-dried to yield 284 g. of preparation WMH–32.6 assaying 9KB u./mg. in tissue culture. 100 g. of this preparation was then dissolved in 600 ml. of methanol and 4 volumes of ether added to precipitate the inactive material. From the methanol-ether supernatant 2 crops of crystalline material were isolated by allowing the solvent to evaporate slowly. These preparations were pooled and redissolved in 35 ml. of water and 5 ml. of 0.1 N hydrochloric acid. The solution was then filtered and adjusted to pH 9.4 with 50% aqueous sodium hydroxide. The sparsomycin A which separated in crystalline form was collected, washed with water, and dried to give 480 mg. of preparation ADA–104.1 having a melting point of 247.8–250.8° C., an optical rotation $[\alpha]_D^{25} -61°$ (c.=0.908 in 0.1 N HCl), an equivalent weight of 170, pKa' of 5.05 in water, and ultraviolet absorption spectrum in Water _____ 269.5 mu, a=44.27
0.01 N $H_2SO_4$ _____ { 227 mu, a=86.06
                                  271 mu, a=41.35
0.01 N KOH _____ 270 mu, a=43.61 a characteristic IR absorption at the following frequencies expressed in reciprocal centimeters:

| | |
|---|---|
| 3400 (S) | 1280 (M) |
| 3310 (S) | 1260 (S) |
| 3240 (S) | 1245 (S) |
| 3220 (S) | 1200 (M) |
| 3140 (S) | 1164 (M) |
| 2950 (S) (oil) | 1137 (S) |
| 2920 (S) (oil) | 1125 (M) |
| 2850 (S) (oil) | 1092 (S) |
| 2620 (M) | 1084 (M) |
| 1910 (W) | 1057 (M) |
| 1650 (S) | 1045 (M) |
| 1645 (S) | 1020 (S) |
| 1600 (S) | 995 (S) |
| 1526 (S) | 955 (M) |
| 1510 (M) | 912 (M) |
| 1480 (S) | 905 (M) |
| 1462 (S) (oil) | 870 (S) |
| 1425 (S) | 852 (W) |
| 1370 (M) (oil) | 843 (W) |
| 1355 (S) | 800 (M) |
| 1342 (M) | 715 (S) |
| 1310 (S) | 702 (S) |
| 1285 (M) | | and the following elemental analysis:

*Analysis.*—Calcd. for $C_{11}H_{14}N_4O_4$: C, 49.62; H, 5.30; N, 21.04. Found: C, 49.62; H, 5.04; N, 20.81.

The characteristics of sparsomycin A, described above, are in good agreement with those reported in the literature for tubercidin. See Anzai, K.; G. Nakamura and S. Suzuki: A new antibiotic, tubercidin. J. Antibiotics, Ser. A., pp. 201–204, Sept. 1957. However, no process whereby tubercidin can be produced is disclosed.

(D) *9 - (2',3' - O - isopropylidene-β-D-ribofuranosyl)-7-deazaadenine; 2',3'-O-isopropylidenesparsomycin A; 7 - (2,3 - O-isopropylidene-β-D-ribofuranosyl)-7H-pyrrolo[2,3-d]pyrimidine*

A mixture of 1 g. of sparsomycin A which had been dried overnight at 108° C. under a reduced pressure of 0.3 mm., 7.5 g. of p-toluenesulfonic acid monohydrate and 50 ml. of acetone which previously had been distilled from potassium permanganate and potassium carbonate in that order, was stirred at room temperature for a period of 2 hours. The reaction mixture was then cooled to 3° C. and a solution of 200 ml. of 0.5 N sodium bicarbonate at 3° C. was added. The resulting solution was evaporated to dryness at 35° C. under reduced pressure. The residue thus obtained was extracted first with two 100-ml. portions of boiling chloroform and then with two 100-ml. portions of chloroform at room temperature. These extracts were filtered individually, then combined and evaporated. The thus-obtained residue was dissolved in 25 ml. of boiling water and the resulting solution was filtered. Refrigeration of the filtrate gave a crystalline precipitate of 2',3' - O - isopropylidenesparsomycin A weighing 0.75 g. (65%) and having a melting point of 170–173° C.

After two additional recrystallizations from water, 9-(2',3' - O - isopropylidene - β - D - ribofuranosyl) - 7-deazaadenine (2',3' - O - isopropylidenesparsomycin A) (2',3' - isopropylidenetubercidin) of melting point 174–177° C. was obtained having the following analysis:

*Analysis.*—Calcd. for $C_{14}H_{18}N_4O_4$: C, 54.89; H, 5.92; N, 18.19; O, 20.92; $CH_3C$, 4.92. Found: C, 54.72; H, 5.92; N, 18.51; O, 21.2; $CH_3C$, 4.3.

(E) *$N^6,N^6,5'$ - tribenzoyl-2',3'-O-isopropylidenetubercidin*

To a solution og 1.74 g. of 2',3' - O - isopropylidenetubercidin in 50 ml. of pyridine in an ice bath was added 4.35 g. of benzoyl chloride. The reaction mixture was stirred in an ice bath for 90 minutes and then poured into 150 ml. of ice water. The mixture was then acidified with 2 N hydrochloric acid and filtered. The solid recovered by filtration was recrystallized from acetone-water to yield 3.28 g. of material which was again recrystallized from acetone-water to yield 2.78 g. of analytically pure $N^6,N^6,5'$ - tribenzoyl - 2',3' - O - isopropylidenetubercidin having a melting point of 131.5–133° C.

*Analysis.*—Calcd. for $C_{35}H_{31}N_4O_7$: C, 67.84; H, 5.04; N, 9.04. Found: C, 67.31; H, 5.04; N, 9.13.

(F.) *$N^6$-benzoyl-2',3'-O-isopropylidenetubercidin*

To a partial solution of 0.5 g. of $N^6,N^6,5'$ - tribenzoyl-2',3' - O - isopropylidenetubercidin in 50 ml. of a mixture of anhydrous tetrahydrofuran and anhydrous methanol (1:1 by volume) in an ice bath was added with stirring 0.2 ml. of 25% sodium methoxide in methanol. The mixture was removed from the ice bath and the reaction followed by thin layer chromatography on silica gel with 50% acetone-50% Skellysolve B hexanes. After 25 minutes at room temperature (about 25° C.) an additional 0.2 ml. of 25% sodium methoxide was added. After 64 minutes most of the starting material had disappeared. The reaction mixture was then cooled overnight (for about 17 hours) in a refrigerator between 0 and 5° C. and then acidified to a pH between 5–6 with the aid of an acid exchange resin (Dower 50 W–X 8). The solution was then concentrated under reduced pressure (40–50° C.) to yield a syrup which was chromatographed over 50 g. of silica gel with a mixture consisting of 25% acetone-75% Skellysolve B hexanes, taking fractions of 7 ml. each. Fractions 80–115 were combined and concentrated to give 210 mg. of $N^6$ - benzoyl - 2',3' - O - isopropylidenetubercidin having the following analysis:

*Analysis.*—Calcd. for $C_{21}H_{22}N_4O_5$: C, 61.30; H, 5.63; N, 13.62. Found: C, 61.05; H, 5.64; N, 13.43.

Recrystallized from ether-Skellysolve B hexanes, $N^6$-benzoyl - 2',3' - O - isopropylidenetubercidin had a melting point of 106.5–109° C.

PREPARATION 2

*6-methylmercapto-9-(2',3'-O-isopropylidene-β-D-ribofuranosyl)-7-deazapurine*

A solution of 6 - mercapto - 9 - β - D - ribofuransoyl-7-deazapurine [Pike et al. [J. Heterocyclic Chem. 1, 159 (1964)]] (1 gm.) in 8 ml. of 0.4 N sodium hydroxide was shaken at about 24° C. for a period of 10 minutes while 0.21 ml. of methyl iodide was added in portions. Another portion of 1.3 ml. of 0.4 N sodium hydroxide was added and the solution was shaken again with 0.21 ml. of methyl iodide. The reaction mixture was allowed to stand for 4 hours at room temperature (about 24° C.) and thereupon in a refrigerator, at about 0 to 5° C. overnight for 20 hours. The solids which separated were collected and filtered, dried over sodium hydroxide, refluxed for several minutes with 6 ml. of absolute ethanol and chilled yielding white needles of 6-methylmercapto-9-β-D-ribofuranosyl)7 - deazapurine, which were recovered by filtration.

A mixture of 1 g. of 6 - methylmercapto - 9 - β - D-ribofuranosyl - 7 - deazapurine which had been dried overnight at 108° C. under a reduced pressure of 0.3 mm., 7.5 g. of p-toluenesulfonic acid monohydrate and 50 ml. of acetone which previously had been distilled from potassium permanganate and potassium carbonate in that order, was stirred at room temperature for a period of 2 hours. The reaction mixture was then cooled to 3° C. under reduced pressure. The residue thus obtained was extracted first with two 100-ml. portions of boiling chloroform and then with two 100-ml. portions of chloroform at room temperature. These extracts were filtered individually, then combined and evaporated. The thus-obtained residue was dissolved in 25 ml. of boiling water and the resulting solution was filtered. Refrigeration of the filtrate gave a crystalline precipitate of 6 - methylmercapto - 9 - (2',3' - O - isopropylidene - β - D - ribofuranosyl)7 - deazapurine.

Substituting in Preparation 2 for methyl iodide another lower alkyl iodide, e.g., ethyl iodide, propyl iodide, isopropyl iodide, butyl iodide, isobutyl iodide and the like, other 6 - alkylmercapto - 9 - (2', 3' - O - isopropylidene-β - D - ribofuranosyl) - 7 - deazapurine compounds are obtained, such as 6 - ethylmercapto - 9 - (2',3' - O - isopropylidene - β - D - ribofuranosyl)7 - deazapurine, 6-propylmercapto - 9 - (2',3' - O - isopropylidene - β - D-ribofuranosyl)7 - deazapurine; 6 - isopropylmercapto - 9- (2',3' - O - isopropylidene - β - D - ribofuranosyl)7-deazapurine; 6 - butylmercapto - 9 - (2',3' - O - isopropylidene - β - D - ribofuranosyl)7 - deazapurine; 6 - isobutylmercapto - 9 - (2',3' - O - isopropylidene - β - D-ribofuranosyl)7 - deazapurine, and the like.

In the same manner given in Preparation 1, 9-β-D-ribofuranosyl-6-hydroxy-7-deazapurine (or in the keto form 7β-D-ribofuranosyl-7H-pyrrolo [2,3-d] pyrimidone-4), 9-β-D-ribofuranosyl-6-mercapto-7-deazapurine, and 9-β-D-ribofuranosyl-7-deazapurine (see Journal of Heterocyclic Chemistry 1, 159 (1964)) are treated with acetone in the presence of a benzenesulfonic acid, e.g., p-toluensulfonic acid, to give the corresponding 2',3'-O-isopropylidene derivatives.

EXAMPLE 1

*N⁶-benzoyl-9-(2',3'-O-isopropylidene-β-D-ribofuranosyl) 7-deazaadenine 5'-phosphate*

A solution of 12 mmoles of freshly prepared cyanoethylphosphate in 12.0 ml. of anhydrous pyridine was additionally dried by repeated concentration under reduced pressure at 35 C. introducing only dry air between the additions of anhydrous pyridine. After the final concentration 2.05 g. (5.0 mmoles) of $N^6$-benzoylisopropylidenetubercidin was added, followed by 100 ml. of especially dried pyridine. The concentration was repeated as above and the residue dissolved in 40 ml. of the same pyridine. Dicyclohexylcarbodiimide (6.19 g., 30 mmoles) was added and the mixture was shaken in the dark, at room temperature (about 23–25° C.) for 4 days. Water (4.0 ml.) was added and the mixture was shaken for an additional 30 minutes with 40 ml. of water, and filtered. The filtrate was concentrated under reduced pressure in a 35° C. bath to yield a syrup which was dissolved in 50 ml. of water and extracted with ether. The aqueous layer was then lyophilized. Upon dissolving the lyophilized solid in water, crystallization occurred. The crystals were filtered and dried in a vacuum dessicator over anhydrous calcium chloride yielding 1.43 g. of $N^6$-benzoyl-9-(2',3'-O-isopropylidene-β-D-ribofuranosyl)-7-deazaadenine 5'-(2-cyanoethyl)phosphate, M.P. 210–211° C.;

$$\lambda_{max.}^{EtOH} \ 303 \ m\mu \ (\epsilon \ 12,000)$$

A small sample (100 mg.) was recrystallized from 12 ml. methanol and 12 ml. water; M.P. 219.5–220° C.

*Analysis.*—Calcd. for $C_{24}H_{26}N_5O_8P$ (543.47): C, 53.03; H, 4.82; N, 12.89; P, 5.70. Found: C, 53.01; H, 4.14; N, 12.47; P, 5.69.

To an ice-cold solution of 544 mg. (1 mmole) $N^6$-benzoyl-9-(2',3'-O-isopropylidene-β-D - ribofuranosyl)-7-deazaadenine 5'-(2-cyanoethyl phosphate) [$N^6$-benzoyl-5'-(β-cyanoethylphosphoryl)isopropylidenetubercidin] in 5.5 ml. each of water and pyridine was added 11.0 ml. of 1.0 N sodium hydroxide. The solution was stirred in an ice-bath for 30 minutes and then adjusted to pH 6 with freshly prepared Dowex 50W–X8 (pyridinium form). The mixture was filtered, the resin washed with water, and the combined filtrates lyophilized to yield 500 mg. of $N^6$ - benzoyl-9-(2',3'-O-isopropylidene-β-D-ribofuranosyl) 7-deazaadenine 5'-phosphate which was used without further purification in the next step.

In the manner given in Example 1, other 9-(2',3'-O-isopropylidene-β-D-ribofuranosyl)-7-deazapurine 5' - phosphate of Formula 11 are prepared by reacting the selected ribofuranosyl-7-deazapurine with 2-cyanoethyl phosphate in the presence of a condensing agent such as N,N'-dicyclohexylcarbodiimide and by decomposing the obtained 9-(2',3'-O-isopropylidene-β-D-ribofuranosyl - 7 - deazapurine 5'-(2-cyanoethylphosphate) with a base to obtain the corresponding 9 - (2',3' - O - isopropylidene-β-D-ribofuranosyl) - 7 - deazapurine 5'-phosphate. Representative compounds thus obtained include: 9-(2',3'-O-isopropylidene - β - D - ribofuranosyl) - 6 - methylmercapto - 7-deazapurine 5' - phosphate; 9 - (2',3' - O - isopropylidene-β - D - ribofuranosyl) - 6 - ethylmercapto - 7 - deazapurine 5' - phosphate; 9 - (2',3' - O - isopropylidene - β - D - ribofuranosyl) - 6 - hydroxy - 7 - deazapurine 5' - phosphate; 9 - (2',3' - O - isopropylidene - β - D - ribofuranosyl) - 6-mercapto - 7 - deazapurine 5' - phosphate, 9 - (2',3' - O-isopropylidene - β - D - ribofuranosyl) - 7 - deazapurine 5'-phosphate and the like.

In the manner given in Preparation 1E and 1F other $N^6$ - acyl - 9 - (2',3' - O - isopropylidene - β - D - ribofuranosyl) - 7 deazaadenines can be prepared by reacting 9-(2',3' - O - isopropylidene - β - D - ribofuranosyl)-7-deazaadenine with an acid chloride or acid anhydride and reacting the resulting material with a base, e.g., sodium or potassium methoxide or ethoxide. Representative compounds of Formula 11 (Z=$N^6$-acylamino) thus obtained include: $N^6$ - acetyl - 9 - (2',3' - O - isopropylidene - β - D-ribofuranosyl) - 7 - deazaadenine; $N^6$ - propionyl-9-2',3'-O - isopropylidene - β - D - ribofuranosyl) - 7 - deazaadenine; $N^6$ - butyryl - 9 - (2',3' - O - isopropylidene - β-D - ribofuranosyl) - 7 - deazaadenine; $N^6$ - valeryl - 9-(2',3' - O - isopropylidene - β - D - ribofuranosyl) - 7-deazaadenine; $N^6$ - hexanoyl - 9 - (2',3' - O - isopropylidene - β - D - ribofuranosyl) - 7 - deazaadenine; $N^6$-phenylacetyl - 9 - (2',3' - O - isopropylidene - β - D - ribofuranosyl) - 7 - deazaadenine; $N^6$ - phenylpropionyl - 9 - (2',3' - O - isopropylidene - β - D - ribofuranosyl) - 7-deazaadenine; $N^6$ - decanoyl - 9 - (2',3' - O - isopropylidene - β - D - ribofuranosyl) - 7 - deazaadenine; $N^6$-lauroyl - 9 - (2',3' - O - isopropylidene - β - D - ribofuranosyl) - 7 - deazaadenine; $N^6$ - anisoyl - 9 - (2',3' - O - isopropylidene - β - D - ribofuranosyl) - 7 - deazaadenine; $N^6$ - (β - cyclopentylpropionyl) - 9 - (2',3' - O - isopropylidene - β - D - ribofuranosyl) - 7 - deazaadenine; $N^6$ heptanoyl - 9 - (2',3' - O - isopropylidene - β - D - ribofuranosyl) - 7 - deazaadenine, and the like. These $N^6$-acyl - 9 - (2',3' - O - isopropylidene - β - D - ribofuranosyl)-7-deazaadenine can be converted to the 5'-phosphates by the method of Example 1.

The preparations of the intermediates of structure X is carried out as shown in tme following preparations:

PREPARATION 3

*1-(5'-O-triphenylmethyl-β-D-arabinofuranosyl)-cytosine*

To a solution of 10 g. of 1-β-D-arabinofuranosylcytosine hydrochloride in 200 ml. of pyridine was added 12 g. of triphenylchloromethane. The reaction mixture was thereupon stirred at room temperature (23–26° C.) for 1 week. The reaction mixture was then poured with stirring into 3 l. of ice water whereupon 1-(5'-O-triphenylmethyl-β-D-arabinofuranosyl)cytosine separated as an oil. The oil solidified on standing with water overnight, and the solids were recovered by filtration, then broken up, washed thoroughly with water and air dried. The thus-obtained solids were triturated with 200 ml. of boiling heptane and the mixture filtered, collecting the insoluble material on a sintered glass funnel. The solids were again washed with 250 ml. portions of boiling heptane and, after having been dried, were transferred into 1 l. of boiling acetone containing 1 g. of active charcoal (Darco G 60). The hot suspension was filtered to remove the charcoal and the filtrate was distilled on a steam bath to a volume of about 75 ml. which was allowed to cool to room temperature, thereby giving a crystalline product. The crystalline product was collected on a sintered glass funnel and washed with one 25-ml. portion of acetone prior cooled on ice. The product was thereupon dried giving 13 g. of 1-(5'-O-triphenylmethyl-β-D-arabinofuranosyl)cytosine of melting point 227–228° C. with decomposition.

*Analysis.*—Calcd. for $C_{28}H_{27}N_3O_5$: C, 69.26; H, 5.61; N, 8.86. Found: C, 69.09; H, 5.67; N, 8.93.

In the same manner, 1'-[5'-O-(p-methoxyphenyl)diphenylmethyl- or 1 - [5' - O-bis(p-methoxyphenyl)phenylmethyl-β-D-arabinofuranosyl]-cytosine can be obtained by reacting cytosine arabinoside or its hydrochloride in pyridine solution with (p-methoxyphenyl)diphenylchloromethane or bis(p - methoxyphenyl)phenylchloromethane at a temperature between 0 and 60° under continuous stirring.

Similarly to Example 1, instead of triphenylchloromethane, triphenylbromomethane can be used to give the same final product 1-(5'-O-triphenylmethyl-β-D-arabinofuranosyl)cytosine.

PREPARATION 4

*1-(5'-O-triphenylmethyl-β-D-arabinofuranosyl)uracil*

In the manner given in Preparation 3, 1-(β-D-arabinofuranosyl)uracil was reacted with triphenylchloromethane in pyridine to give 1-(5'-O-phenylmethyl-β-D-arabinofuranosyl)uracil.

PREPARATION 5

*9-(5'-O-triphenylmethyl-β-D-arabinofuranosyl)thymine*

In the manner given in Preparation 3, 1-(β-D-arabinofuranosyl)thymine was reacted with triphenylchloromethane in pyridine to give 1-(5'-O-triphenylmethyl-β-D-arabinofuranosyl)thymine.

PREPARATION 6

*9-(5'-O-triphenylmethyl-β-D-arabinofuranosyl)adenine*

In the manner given in Preparation 3, 9-(β-D-arabinofuranosyl)adenine was reacted with triphenylbromomethane in pyridine to give 9-(5'-O-triphenylmethyl-β-D-arabinofuranosyl)adenine.

PREPARATION 7

*9-[5'O-(p-methoxyphenyl)diphenylmethyl-β-D-arabinofuranosyl]adenine*

In the manner given in Preparation 3, 9-(β-D-arabinofuranosyl)adenine was reacted with (p-methoxyphenyl)diphenylchloromethane in pyridine to give 9-[5'-O-(p-methoxyphenyl)diphenylmethyl - β - D-arabinofuranosyl] adenine.

PREPARATION 8

*9-(5'-O-triphenylmethyl-β-D-arabinofuranosyl)(6-mercaptopurine)*

In the manner given in Preparation 3, 9-(β-D-arabinofuranosyl)-6-mercaptopurine was reacted with triphenylchloromethane in pyridine to give 9-(5'-O-triphenylmethyl-β-D-arabinofuranosyl)(6-mercaptopurine).

PREPARATION 9

*1-(5'-O-triphenylmethyl-β-D-arabinofuranosyl)5-chlorouracil*

In the manner given in Preparation 3, 1-(β-D-arabinofuranosyl)5-chlorouracil was reacted with triphenylchloromethane in pyridine to give 1-(5'-O-triphenylmethyl-β-D-arabinofuranosyl)5-chlorouracil.

PREPARATION 10

*1-(5'-O-triphenylmethyl-β-D-arabinofuranosyl)5-fluorouracil*

In the manner give in Preparation 3, 1-(β-D-arabinofuranosyl)5-fluorouracil was reacted with triphenylchloromethane in pyridine to give 1-(5'-O-triphenylmethyl-β-D-arabinofuranosyl)5-fluorouracil.

PREPARATION 11

*1-(5'-O-triphenylmethyl-β-D-arabinofuranosyl)5-trifluoromethyluracil*

In the manner given in Preparation 3, 1-(β-D-arabinofuranosyl)5-trifluoromethyluracil was reacted with triphenylchloromethane in pyridine to give 1-(5'-O-triphenylmethyl-β-D-arabinofuranosyl)5-trifluoromethyluracil.

PREPARATION 12

*1-(5'-O-triphenylmethyl-β-D-arabinofuranosyl)5-bromouracil*

In the manner given in Preparation 3, 1-(β-D-arabinofuranosyl)5-bromouracil was reacted with triphenylchloromethane in pyridine to give 1-(5'-O-triphenylmethyl-β-D-arabinofuranosyl)5-bromouracil.

PREPARATION 13

*1-(5'-O-triphenylmethyl-β-D-arabinofuranosyl)5-iodouracil*

In the manner given in Preparation 3, 1-(β-D-arabinofuranosyl)5-iodouracil was reacted with triphenylchloromethane in pyridine to give 1-(5'-O-triphenylmethyl-β-D-arabinofuranosyl)5-iodouracil.

PREPARATION 14

*9-(5'-O-triphenylmethyl-β-D-arabinofuranosyl)guanine*

In the manner given in Preparation 3, 9-(β-D-arabinofuranosyl)guanine was reacted with triphenylchloromethane in pyridine to give 9-(5'-O-triphenylmethyl-β-D-arabinofuranosyl)guanine.

PREPARATION 15

*9-(5'-O-triphenylmethyl-β-D-arabinofuranosyl)hyproxanthine*

In the manner given in Preparation 3, 9-(β-D-arabinofuranosyl)hypoxanthine was reacted with triphenylchloromethane in pyridine to give 9-(5'-O-triphenylmethyl-β-D-arabinofuranosyl)hypoxanthine.

PREPARATION 16

*9-(5'-O-triphenylmethyl-β-D-arabinofuranosyl)xanthine*

In the manner given in Example 1, 9-(β-D-arabinofuranosyl)xanthine was reacted with triphenylbromomethane in pyridine to give 9-(5'-O-triphenylmethyl-β-D-arabinofuranosyl)xanthine.

PREPARATION 17

*1-[5'-O-(p-methoxyphenyl-β-D-arabinofuranosyl]5-methylcytosine*

In the manner given in Preparation 3, 1-(β-D-arabinofuranosyl)5-methylcytosine was reacted with (p-methoxyphenyl)diphenylchloromethane in pyridine to give 1-[5'-O-(p-methoxyphenyl)diphenylmethyl - β-D-arabinofuranosyl]5-methylcytosine.

PREPARATION 18

*1-(5'-O-triphenylmethyl-β-D-arabinofuranosyl)3-methylcytosine*

In the manner given in Preparation 3, 1-(β-D-arabinofuranosyl)3-methylcytosine was reacted with triphenylchloromethane in pyridine to give 1-(5'-triphenylmethyl-β-D-arabinofuranosyl)3-methylcytosine.

PREPARATION 19

*9-(5'-O-triphenylmethyl-β-D-ribofuranosyl)adenine*

In the manner given in Preparation 3, 9-(β-D-ribofuranosyl)adenine was reacted with triphenylbromomethane in pyridine to give 9-(5'-O-triphenylmethyl-β-D-ribofuranosyl)adenine.

PREPARATION 20

*1-[5'-O-(p-methoxyphenyl)diphenylmethyl-β-D-ribofuranosyl]5-methylcytosine*

In the manner given in Preparation 3, 1-(β-D-arabinofuranosyl)5-methylcytosine was reacted with (p-methoxyphenyl)diphenylchloromethane in pyridine to give 1-[5'-O - (p - methoxyphenyl)diphenylmethyl - β - D-ribofuranosyl]5-methylcytosine.

PREPARATION 21

*1-(5'-O-triphenylmethyl-β-D-ribofuranosyl)5-trifluoromethyluracil*

In the manner given in Preparation 3, 1-(β-D-ribofuranosyl)5-trifluoromethyluracil was reacted with triphenylchloromethane in pyridine to give 1-(5'-O-triphenylmethyl-β-D-ribofuranosyl)5-trifluoromethyluracil.

PREPARATION 22

*1-(5'-O-triphenylmethyl-β-D-ribofuranosyl)cytosine*

In the manner given in Preparation 3, 1-(β-D-ribofuranosyl)cytosine was reacted with triphenylchloromethane in pyridine to give 1-(5'-O-triphenylmethyl-β-D-ribofuranosyl)cytosine.

PREPARATION 23

*1-(5'-O-triphenylmethyl-β-D-ribofuranosyl)3-methylcytosine*

In the manner given in Preparation 3, 1-(β-D-ribofuranosyl)3-methylcytosine was reacted with triphenylchloromethane in pyridine to give 1-(5'-O-triphenylmethyl-β-D-ribofuranosyl)3-methylcytosine.

PREPARATION 24

*1-(5'-O-triphenylmethyl-β-D-deoxyribofuranosyl)-uracil*

In the manner given in Preparation 3, 1-(β-D-deoxyribofuranosyl)uracil was reacted with tripheynlchloromethane to give 1-(5'-O-triphenylmethyl-β-D deoxyribofuranosyl)uracil.

PREPARATION 25

*1-(5'-O-triphenylmethyl-β-D-deoxyribofuranosyl)-cytosine*

In the manner given in Preparation 3, 1-(β-D-deoxyribofuranosyl)cytosine was reacted with triphenylchloromethane in pyridine to give 1-(5'-O-triphenylmethyl-β-D-deoxyribofuranosyl)cytosine.

PREPARATION 26

*9-(5'-O-triphenylmethyl-β-D-deoxyribofuranosyl)-adenine*

In the manner given in Preparation 3, 9-(β-D-deoxyribofuranosyl)adenine was reacted with tripheynlbromomethane in pyridine to give 9-(5'-O-triphenylmethyl-β-D-deoxyribofuranosyl)adenine.

PREPARATION 27

*1-[5'-O-(p-methoxyphenyl)diphenylmethyl-β-D-deoxyribofuranosyl]5-iodouracil*

In the manner given in Preparation 3, 1-(β-D-deoxyribofuranosyl)5-iodouracil was reacted with (p-methoxyphenyl)diphenylchloromethane in pyridine to give 1-[5'-O-(p - methoxyphenyl)diphenylmethyl - β - D - deoxyribofuranosyl]5-iodouracil.

PREPARATION 28

*1-(5'-O-triphenylmethyl-β-D-deoxyribofuranosyl)-5-fluorouracil*

In the manner given in Preparation 3, 1-(β-D-deoxyribofuranosyl)5-fluorouracil was reacted with triphenylchloromethane in pyridine to give 1-(5'-O-triphenyl-β-D-deoxyribofuranosyl)5-fluorouracil.

PREPARATION 29

*1-(5'-O-triphenylmethyl-β-D-deoxyribofuranosyl)-thymine*

In the manner given in Preparation 3, 1-(β-D-deoxyribofuranosyl)thymine was reacted with triphenylchloromethane in pyridine to give 1-(5'-O-triphenylmethyl-β-D-deoxyribofuranosyl)thymine.

PREPARATION 30

*9-(5'-O-triphenylmethyl-β-D-deoxyribofuranosyl)-guanine*

In the manner given in Preparation 3, 9-(β-D-deoxyribofuranosyl)guanine was reacted wit htriphenylbromomethane in pyridine to give 9-(5'-O-triphenylmethyl-β-D-deoxyribofuranosyl)guanine.

PREPARATION 31

*9-[5'-O-(p-methoxyphenyl)diphenylmethyl-β-D-deoxyribofuranosyl]xanthine*

In the manner given in Preparation 3, 9-(β-D-arabinofuranosyl)xanthine was reacted with (p-methoxyphenyl)diphenylchloromethane in pyridine to give 9-[5'-O-(p-methoxyphenyl)diphenylmethyl - β - D - arabinofuranosyl]xanthine.

PREPARATION 32

*9-[5'-O-(p-methoxyphenyl)diphenylmethyl-β-D-deoxyribofuranosyl]hypoxanthine*

In the manner given in Preparation 3, 9-(β-D-deoxyribofuranosyl)hypoxanthine was reacted with (p-methoxyphenyl)diphenylchloromethane in pyridine to give 9-[5'-O-(p-methoxyphenyl)diphenylmethyl - β - D - deoxyribofuranosyl]hypoxanthine.

In the same manner given in Preparation 3, other [5'-trityl-,[5' - (p - methoxyphenyl)diphenylmethyl-, and [5'-bis(p-methoxyphenyl)phenylmethyl - β - D - ribofuranose and deoxyribofuranose]N - hetrocyclic compound can be prepared by reacting a compound selected from triphenylchloromethane, triphenylbromomethane, (p - methoxyphenyl)diphenylchloro(or bromo)methane and bis (p - methoxyphenyl)phenylchloro(or bromo)methane with a β-D-ribofuranosyl or β-D-(deoxyribofuranosyl)N-heterocyclic to give a compound of Formula VI. Representative compounds of Formula VI thus produced include 9-(5'-O-triphenylmethyl-β-D-ribofuranosyl)-guanine, 1 - (5′-O-triphenylmethyl-β-D-ribofuranosyl)5 - bromouracil,
1-(5′-O-triphenylmethyl - β - D - ribofuranosyl)5-iodouracil,
9(5′-O-triphenylmethyl - β - D - ribofuranosyl)hypoxanthine,
9-(5′-O-triphenylmethyl-β-D-ribofuranosyl)xanthine,
9-(5′-O-triphenylmethyl-β-D-deoxyribofuranosyl) hypoxanthine,
1-(5′-O-(p-methoxyphenyl)diphenylmethyl-β-D-deoxyribofuranosyl)thymine,
1-(5′-O-triphenylmethyl-β-D-deoxyribofuranosyl)3-methylcytosine, 1-[5′-O-triphenylmethyl-β-D-ribofuranosyl]5-hydroxymethylcytosine;
9-[5′-O-triphenylmethyl-β-D-deoxyribofuranosyl]7-deazaadenine;
9-[5′-O-(p-methoxyphenyl)diphenylmethyl-β-D-arabinofuranosyl]6-mercapto-7-deazapurine;
1-[5′-O-triphenylmethyl-β-D-arabinofuranosyl]6-azauracil,
9-[5′-O-triphenylmethyl-β-D-deoxyribofuranosyl]7-deazahypoxanthine and the like.

PREPARATION 33

9-β-D-arabinofuranosylguanine

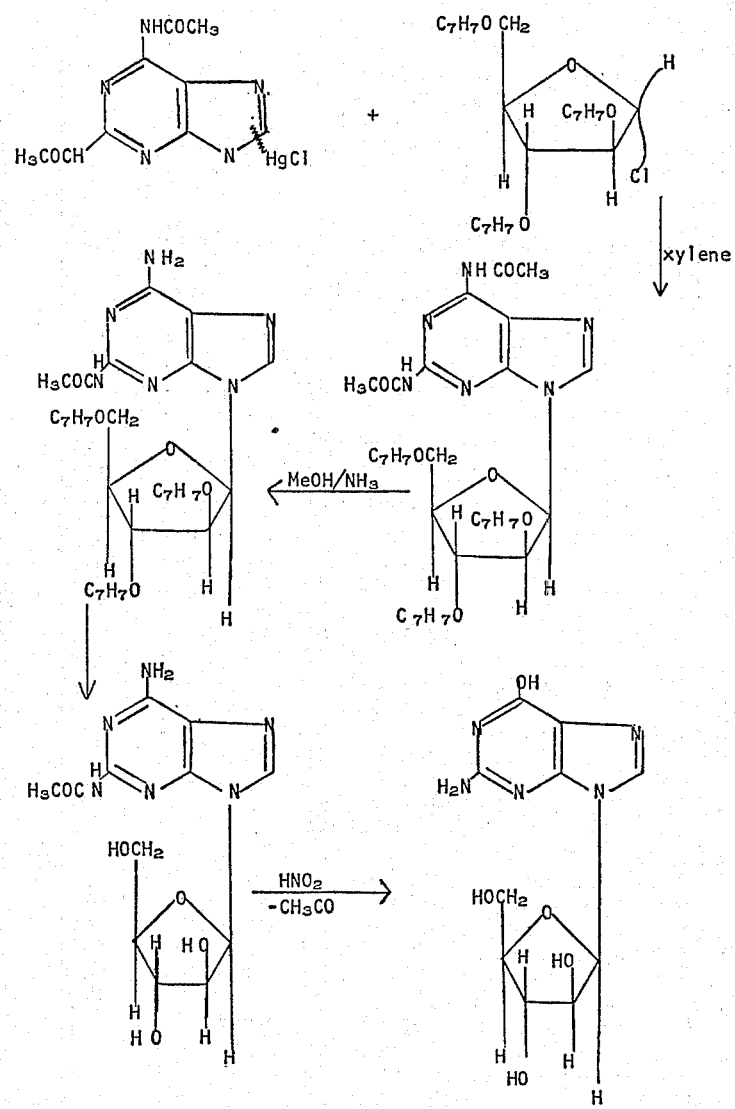

1-(5′-O-triphenylmethyl-β-D-deoxyribofuranosyl)5-methylcytosine,
1-(5′-O-triphenylmethyl-β-D-deoxyribofuranosyl) 5-trifluoromethyluracil,
1-(5′-O-triphenylmethyl-β-D-deoxyribofuranosyl)5-bromouracil,
1-[5′-O-(p-methoxyphenyl)diphenylmethyl-β-D-deoxyribofuranosyl]-5-chlorouracil,
9-[5′-O-triphenylmethyl-β-D-deoxyribofuranosyl]-6-mercaptopurin,
1-[5′-O-bis(p-methoxyphenyl)phenylmethyl-β-D-deoxyribofuranosyl]3-methylcytosine,
1-[5′-O-bis(p-methoxyphenyl)-phenylmethyl-β-D-deoxyribofuranosyl)5-methyluracil,
9-[5′-O-bis(p-methoxyphenyl)phenylmethyl-β-D-deoxyribofuranosyl) 2,6-diaminopurine;

The group $C_7H_7O$ in the above formulae designates the benzyloxy group:

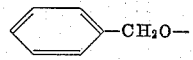

With mechanical stirring, a suspension of 5.15 g. (11.0 millimoles) of the chloromercury derivative of 2,6 - diacetamidopurine [J. Davoll and B. A. Lowry, J. Am. Chem. Soc. 73, 1650 (1951)], 4.0 g. of purified diatomaceous earth (Celite) and 325 ml. of xylene was dried by azeotropic distillation of (50 mls.). A solution of 4.39 g. (10.0 millimoles) of crude, syrupy 2,3,5-tri-O-benzyl-D - arabinofuranosyl - chloride [C. P. J. Glaudemans and H. G. Fletcher, Jr., J. Org. Chem., 28, 3004 (1963)] in 50 ml. of purified xylene was added to the hot, stirred suspension and the latter was refluxed with continued stirring and exclusion of external moisture for 3 hours.

The hot mixture was filtered through a bed of Celite (diatomaceous earth) and the filter bed washed with hot xylene. The pooled filtrate was concentrated in vacuo to a volume of ca. 100 ml., and the concentrate added to an excess of Skellysolve B with stirring. The resulting precipitate was collected, washed with Skellysolve B and dried in air. The crude solid was stirred with chloroform, the mixture filtered and the filter washed thoroughly with chloroform. The combined chloroform filtrate was washed three times with 30% aqueous potassium iodide solution, twice with water and the organic layer dried over anhydrous sodium sulfate. The solvent was removed in vacuo. The residue was swirled with methanol and the mixture evaporated to dryness in vacuo to afford 62% of a foamy solid of an anomeric mixture in which 9(2',3',5'-tri-O-benzyl - β - D - arabinofuranosyl) - 2,6 - diacetamidopurine was the major component.

A solution of 2.54 g. (4.0 millimoles) of the crude material in 100 ml. of methanol which had been saturated at 0° with dry amomnia was stored at 0° for about 16 hours. The solution was evaporated to dryness in vacuo and acetamide separated by sublimation under diminished pressure to yield 1.93 g. (81%) of amorphous solid consisting principally of the β - anomer of 9 - (2',3',5' - tri-O - benzyl - D - arabinofuranosyl) - 2 - acetamido - 6-aminopurine.

Hydrogenolysis of 2.97 g. (5.0 millimoles) of the crude monoacetamido derivative (above) essentially as described by Glaudemans and Fletcher [J. Org. Chem., 28, 3004 (1963)] for tri - O - benzyl - β - arabinofuranosyladenine followed by crystallization from water gave 1.44 g. (89%) of 9 - β - D - arabinofuranosyl - 2 - acetamido - 6 - aminopurine.

A solution of 1.30 g. (4.0 millimoles) of the monoacetate above and 3.2 g. of sodium nitrite in 10 ml. of hot water was cooled to ambient temperature, 3.2 ml. of glacial acetic acid was added and the mixture stirred mechanically until solution was complete. Stirring was continued for approximately 1 hour, the solution diluted with an equal volume of water and stirred at room temperature for 16 hours. The pH of the solution was adjusted to 4 (pHydrion paper), and the solution concentrated in vacuo to dryness. The dry residue was stirred with hot methanol, the suspension filtered hot and the filter washed with hot methanol. To the combined methanolic filtrate (ca. 40 ml.) was added 460 mg. (2.0 milligram atoms) of sodium and the solution was refluxed for 1 hour. After neutralization with acetic acid, the solution was concentrated to a volume of 30–40 ml. and the resulting slurry was refrigerated at 5° for several hours. The crude product was collected, washed thoroughly with water, then crystallized twice from water in the presence of activated charcoal to give 6.77 mg. (60%) of 9-β-D-arabinofuranosyl-2-guanine as glistening needles.

Further treating of 9-β-D-arabinofuranosylguanine with sodium nitrite and acetic acid gave 9-β-D-arabinofuranosylxanthine. In the same manner treatment of 9 - β - D-arabinofuranosyladenine with sodium nitrite and acetic acid resulted in 9-β-D-arabinofuranosylhypoxanthine.

In the foregoing and subsequent synthesis various ion exchange resins (Dow Co.) are utilized which can be described as follows:

*Dowex 50X8.*—Dowex 50X8 is a strongly acidic cation exchange resin composed of nuclear sulfonic acid exchange groups attached to a styrene polymer lattice crosslinked with approximately 8% divinylbenzene.

*Dowex 50WX8.*—Dowex 50WX8 is a specially purified form of Dowex 50X8 in which the resin was a *white* (W) color rather than the yellow-brown color of Dowex 50X8.

*Dowex 1X8.*—Dowex 1X8 is a strongly basic cation exchange resin of quaternary ammonium exchange groups attached to a styrene polymer lattice.

*Dowex AG 1X8.*—Dowex AG 1X8 is a specially purified and sized form of Dowex 1X8, supplied by Bio-Rod Laboratories, Richmond, Calif.

PREPARATION 34

$N^4$-benzoyl-1-(2',3'--di-O-benzoyl-5'-O-triphenylmethyl-β-D-arabinofuranosyl)cytosine A mixture of 6.2 g. of 1-(5'-O-triphenylmethyl-β-D-arabinofuranosyl)cytosine, 40 ml. of dry pyridine, and 6 ml. of benzoyl chloride was stirred at room temperature (24–26° C.) for about 20 hours. The thus-obtained reaction mixture was then poured into 500 ml. of cold water and stirred at room temperature for 3 hours. The aqueous portion was decanted and the residual gummy material was washed twice with water by decantation. The gum and solids were dissolved in 150 ml. of methylene chloride and this solution was extracted consecutively twice with 50-ml. portions of water and once with 50 ml. of a saturated aqueous sodium chloride solution. The methylene chloride solution was then dried by passing it through 10 g. of anhydrous sodium sulfate, supported on a sintered glass funnel. The drying agent was washed with 20 ml. of methylene chloride and the washing combined with the filtrate. The methylene chloride solution was thereupon evaporated at 40° in vacuo to give $N^4$-benzoyl-1-(2',3'-di-O-benzoyl-5'-O-triphenylmethyl-β-D-arabinofuranosyl)cytosine.

PREPARATION 35

$N^4$-acetyl-1-(2',3'-di-O-acetyl-5'-O-triphenylmethyl-β-D-arabinofuranosyl)cytosine A suspension of 750 mg. of 1-(5'-O-triphenylmethyl-β-D-arabinofuranosyl)cytosine in 9 ml. of pyridine was treated with 3 ml. of acetic anhydride with stirring until a uniform solution was obtained. Stirring was then continued for 2 hours whereupon the solution became a crystalline mass. This material was transferred into 90 ml. of water yielding a white crystalline material which was collected by filtration, the solids were washed thoroughly with water, and dried giving 950 mg. of crystals of melting point 249–259.5° C. This material was recrystallized from ethanol giving 800 mg. of colorless rosettes of $N^4$-acetyl-1-(2',3'-di-O-acetyl-5' - O-triphenylmethyl-β-D-arabinofuranosyl)cytosine of melting point 251–252° C.

*Analysis.*—Calcd. for $C_{34}H_{33}O_7N_3$: C, 66.76; H, 5.44; N, 6.87. Found: C, 67.04; H, 5.47; N, 7.00.

PREPARATION 36

$N^4$-butyryl-9-(2',3'-di-O-butyryl-5'-O-triphenylmethyl-β-D-arabinofuranosyl)adenine In the manner given in Preparation 35, 9-(5'-O-triphenylmethyl-β-D-arabinofuranosyl)adenine was reacted with butyric anhydride in pyridine to give $N^6$-butyryl-9-(2',3'-di-O-butyryl-5'-O - triphenylmethyl-β-D - arabinofuranosyl)adenine.

PREPARATION 37

$N^2$-benzoyl-9-(2',3'-di-O-benzoyl-β-D-arabinofuranosyl)guanine

In the manner given in Preparation 34, 9-(5'-O-triphenylmethyl-β-D-arabinofuranosyl)guanine was reacted with benozyl chloride to give $N^2$-benzoyl-9-(2',3'-di-O-benzoyl-5'-O-triphenylmethyl - β - D - arabinofuranosyl) guanine.

PREPARATION 38

$N^4$-acetyl-1-(3'-O-acetyl-5'-O-triphenylmethyl-β-D-deoxyribofuranosyl)5-methylcytosine In the manner given in Preparation 34, 1 - (5' - O - triphenylmethyl-β-D-deoxyribofuranosyl)5 - methylcytosine was reacted with acetic anhydride to give $N^4$-acetyl-1-(3'-O-acetyl-5'-O - triphenylmethyl-β-D-deoxyribofuranosyl)5-methylcytosine.

In the manner given in Preparation 34, other acyl compounds of Formula VII can be produced by reacting a compound of Formula VI with an acid anhydride, acyl chloride or acyl bromide wherein the acyl groups are of a hydrocarbon carboxylic acid containing from 2 to 12 carbon atoms, inclusive, and anisic acid. Compounds thus obtained include: $N^4$-lauroyl-9-(2′,3′-di-O-lauroyl-5′-O-triphenylmethyl-β-D - arabinofuranosyl)adenine, 9-(2′,3′-di-O-valeryl-5′-O-triphenylmethyl - β-D-ribofuranosyl)hypoxtanthine, 9-(2′,3′-di-O-hexanoyl - 5′-O-triphenylmethyl-β-D-ribofuranosyl)xanthine, 3-(2′,3′-di-O-octanoyl-5′-O-triphenylmethyl-β - D-ribofuranosyl)3-uracil, 1-(2′,3′-di-O - isobutyryl-5′-O - triphenylmethyl - β-D-ribofuranosyl)5-fluorouracil, 1-(2′,3′-di-O-anisoyl - 5′-O-triphenylmethyl - β-D - ribofuranosyl)thymine, $N^4$-phenylacetyl-1-(2′,3′-di-O-phenylacetyl-5′ - O-triphenylmethyl-β-D-ribofuranosyl)3-methylcytosine, 1 - (3′-O-butyryl-5′-O-triphenylmethyl-β-D-deoxyribofuranosyl)5 - iodouracil, 1-(3′-O-undecanoyl-5′-O - triphenylmethyl-β-D - deoxyribofuranosyl)5-trifluoromethyluracil, 1-(3′-O-decanoyl - 5′-O-triphenylmethyl-β - deoxyribofuranosyl)5 - bromouracil, 9-(3′-O-heptanoyl-5′-O - triphenylmethyl-β-D-deoxyribofuranosyl)guanine, 9-(3′-O-nonanoyl-5′-O-triphenylmethyl-β-D - deoxyribofuranosyl)6 - mercaptopurine, 9-(3′-O-octanoyl-5′-O-triphenylmethyl - β-D-deoxyribofuranosyl)-xanthine, and the like.

PREPARATION 39

$N^4$-anisoyl-1-[5′-O-(p-methoxyphenyl)diphenyl-methyl-β-D-arabinofuranosyl]cytosine (A) $N^4$-anisoyl-1-β-D-arabinofuranosylcytosine.—5 g. of 1-β-D-arabinofuranosylcytosine and 25 ml. of anisoyl chloride were dissolved in 100 ml. of pyridine and the solution stirred at about 25° for 6 hours. To this mixture was added 400 ml. of 1.5 N hydrochloric acid and the thus-obtained solution was allowed to stand overnight at room temperature between 22–24° C. The solids were then filtered, washed and ground thoroughly with water and air-dried. They were thereupon suspended in a mixture consisting of 275 ml. of water and 251 ml. of ethanol which mixture was warmed to 70° C. on a steam bath. The crude suspension was then chilled to 4° and the pH adjusted to 8 by adding 1 N sodium hydroxide solution. The solids were immediately recovered by filtration, washed with water, air-dried, and then washed with 300 ml. of ether, filtered and air-dried to give 16.6 g. of crude product. This crude product was taken up with 195 ml. of pyridine and 65 ml. of water and chilled to ice temperature. The solution was then treated with vigorous stirring with 350 ml. of 1.5 N sodium hydroxide for one-half hour. The reaction was then terminated by the addition of 350 ml. of Dowex 50X8 (50–100 mesh) pyridinium resin followed by stirring for 20 minutes (pH 7.0). The solution was filtered free of insoluble material and the resulting residue was washed with water. The combined filtrates were taken to dryness in vacuo at 50° C. and the residue stirred with three 200 ml. portions of ether and filtered. The solid was then suspended in 300 ml. of boiling water and filtered 3 times. The combined filtrates were evaporated to a small volume under reduced pressure giving 2.0 g. of product, of melting point 197–200° C. (decomposition). This crude material was recrystallized 4 times from water, once from ethanol, to give $N^4$-anisoyl-1-β-D-arabinofuranosylcytosine of melting point 200.5 to 201.5° with decomposition.

Analysis.—Calcd. for $C_{17}H_{19}O_7N_3$: C, 54.11; H, 5.08; N, 11.14. Found: C, 54.38; H, 4.82; N, 11.31.

(B) $N^4$-anisoyl-1-[5′-O-(p - methoxyphenyl)diphenyl-methyl-β-D-arabinofuranosyl]cytosine.—A solution of 4.8 g. of $N^4$-anisoyl-1-β-D-arabinofuranosyl]cytosine in 50 ml. of pyridine was treated with (p-methoxyphenyl)-diphenylchloromethane. After 9 hours, 10 ml. of methanol was added and the pyridine solution poured into 600 ml. of water under stirring. When the gum had coagulated, the solution was decanted, the gum was washed several times with water by decantation and then taken up in methylene chloride, washed with water twice and once with saturated sodium chloride solution. The solution was then dried over anhydrous sodium sulfate and evaporated to dryness at 30° in vacuo, to give a residue. This residue was dissolved in benzene and thereupon absorbed on a column of silica gel (5.8 x 48 cm.) and the column was then eluted as follows: twenty 100-ml. fractions of 2% methanol, 98% benzene and then 40 fractions of 100 ml. of 5% methanol, 95% benzene. Fractions 49–60 were triturated with ether, giving a crystalline solid which was collected and washed with ether, providing 4.21 g. of crude $N^4$-anisoyl-1-[5′ - O - (p - methylphenyl)diphenyl-methyl-β-D-arabinofuranosyl]cytosine.

PREPARATION 40

$N^4$-benzoyl-1-(5′-O-triphenylmethyl-β-D-arabino-furanosyl)cytosine (A) $N^4$-benzoyl-1-β-D-arabinofuranosylcytosine. — A solution containing 0.5 g. of $N^4$-benzoyl-1-(2′,3′-di-O-benzoyl-β-D-arabinofuranosyl)cytosine, dissolved in 17 ml. of ethanol, was cooled to 5° C. and thereto was added 0.4 g. of sodium hydroxide in 3 ml. of water. The mixture was allowed to stand at 5° C. for 30 minutes, then poured into 80 ml. of ice water, neutralized with 1 N hydrochloric acid and then filtered. The precipitate which was collected was washed on the filter with water and then twice recrystallized from ethanol-Skellysolve to give $N^4$-benzoyl-1-β-D-arabinofuranosylcytosine.

(B) $N^4$ - benzoyl-1-(5′-O-triphenylmethyl-β-D-arabino-furanosyl)cytosine.—In the manner given in Preparation 3, $N^4$-benzoyl-1-β-D-arabinofuranosylcytosine was treated with triphenylchloromethane at 22–25° C. for 8 days to give $N^4$-benzoyl-1-(5′-O-triphenylmethyl - β - D-arabino-furanosyl)cytosine.

PREPARATION 41

$N^6$-butyryl-1-(5′-O-triphenylmethyl-β-D-arabino-furanosyl)adenine (A) $N^6$-butyryl-1-β-D-arabinofuranosyladenine. — In the manner given in Preparation 40, $N^6$-butyryl-1-(2′,3′-di-O-butyryl-β-D-arabinofuranosyl)cytosine was treated at 5° C. with sodium hydroxide to give $N^6$-butyryl-1-β-D-arabinofuranosyladenine.

(B) $N^6$ - butyryl-1-(5′-O-triphenylmethyl-β-D-arabino-furanosyl)adenine.—In the manner given in Preparation 3, $N^6$-butyryl-1-β-D-arabinofuranosyladenine was treated with triphenylchloromethane at 22–25° C. for 8 days to give $N^6$-butyryl - 1 - (5′-O-triphenylmethyl-β-D-arabino-furanosyl)adenine.

PREPARATION 42

$N^2$-benzoyl-9-(5′-O-triphenylmethyl-β-D-arabino-furanosyl)guanine (A) $N^2$-benzoyl-9-β-D-arabinofuranosylguanine. — In the manner given in Preparation 40 $N^2$-benzoyl-9-(2′,3′-di-O-benzoyl-β-D-arabinofuranosyl)guanine was treated at 5° with sodium hydroxide to give $N^2$-benzoyl-9-β-D-arabinofuranosylguanine.

(B) $N^2$ - benzoyl-9-(5′-O-triphenylmethyl-β-D-arabino-furanosyl)guanine.—In the manner given in Preparation 3, $N^2$-benzoyl-1-β-D-arabinofuranosylguanine was treated with triphenylchloromethane at 22–25° C. for 8 days to give $N^2$-benzoyl - 9 - (5′-O-triphenylmethyl-β-D-arabino-furanosyl)guanine.

PREPARATION 43

$N^4$-valeryl-1-(5′-O-triphenylmethyl-β-D-arabino-furanosyl)5-methylcytosine (A) $N^4$-valeryl - 1 - β - D-arabinofuranosyl-5-methyl-cytosine.—In the manner given in Preparation 40 $N^4$-valeryl-1-(2′,3′-di-O-valeryl - β - D - arabinofuranosyl)5-methylcytosine was treated at 5° with sodium hydroxide to give $N^4$-valeryl - 1 - β - D-arabinofuranosyl-5-methyl-cytosine.

27

(B) *N⁴ - valeryl-1-(5'-O-triphenylmethyl-β-D-arabinofuranosyl)-5-methylcytosine.*—In the manner given in Preparation 3, N⁴-valeryl - 1 - β - D-arabinofuranosyl-5-methylcytosine was treated with triphenylchloromethane at 22–25° C. for 8 days to give N⁴-valeryl-1-(5'-O-triphenylmethyl-β-D-arabinofuranosyl)5-methylcytosine.

PREPARATION 44

*N⁴-lauroyl-1-(5'-O-triphenylmethyl-β-D-arabinofuranosyl)3-methylcytosine*

(A) *N⁴-lauroyl - 1 - β - D - arabinofuranosyl-3-methylcytosine.*—In the manner given in Preparation 40, N⁴-lauroyl-1-(2',3'-di-O-lauroyl - β - D-arabinofuranosyl)3-methylcytosine was treated at 5° with sodium hydroxide to give N⁴-lauroyl - 1 - β-D-arabinofuranosyl-3-methylcytosine.

(B) *N⁴ - lauroyl-1-(5'-O-triphenylmethyl-β-D-arabinofuranosyl)-3-methylcytosine.*—In the manner given in Preparation 3, N⁴-lauroyl - 1 - β - D-arabinofuranosyl-3-methylcytosine was treated with triphenylchloromethane at 22–25° C. for 8 days to give N⁴-lauroyl-1-(5'-O-triphenylmethyl-β-D-arabinofuranosyl)3-methylcytosine.

PREPARATION 45

*N⁴-benzoyl-1-(5'-O-triphenylmethyl-β-D-ribofuranosyl) cytosine*

(A) *N⁴-benzoyl-1-β-D-ribofuranosylcytosine.* — In the manner given in Preparation 40 N⁴-benzoyl-1-(2',3'-di-O-benzoyl-β-D-ribofuranosylcytosine was treated at 5° with sodium hydroxide to give N⁴-benzoyl-1-β-D-ribofuranosylcytosine.

(B) *N⁴-benzoyl - 1 - (5'-O-triphenylmethyl-β-D-ribofuranosyl)-cytosine.*—In the manner given in Preparation 3, N⁴-benzoyl-1-β-D-ribofuranosylcytosine was treated with triphenylchloromethane at 22–25° C. for 8 days to give N⁴ - benzoyl - 1 - (5'-O-triphenylmethyl-β-D-ribofuranosyl)cytosine.

PREPARATION 46

*N⁶-acetyl-9-(5'-O-triphenylmethyl-β-D-ribofuranosyl)adenine*

(A) *N⁶ - acetyl - 9-β-D-ribofuranosyladenine.*—In the manner given in Preparation 40; N⁶-acetyl-9-(2',3'-di-O-acetyl-β-D-ribofuranosyl)adenine was treated at 5° with sodium hydroxide to give N⁶-acetyl-9-β-D-ribofuranosyladenine.

(B) *N⁶ - acetyl-9-(5-O-triphenylmethyl-β-D-ribofuranosyl)adenine.*—In the manner given in Preparation 3, N⁶-acetyl-9-β-D-ribofuranosyladenine was treated with triphenylchloromethane at 22–25° C. for 8 days to give N⁶-acetyl - 9 - (5' - O-triphenylmethyl-β-D-ribofuranosyl)adenine.

In the same manner given in Preparation 40 and Preparation 3, other compounds of Formula X are obtainable by treating a compound of structure VII with a base and etherifying the product. Representative products (of Formula X) thus obtained include: N⁴-acetyl-1-(5'-O-triphenylmethyl - β-D-arabinofuranosyl)cytosine, N⁴-propionyl - 1-(5'-O-triphenylmethyl-β-D-arabinofuranosyl)-cytosine, N⁴ - butyryl-1-(5'-O-triphenylmethyl-β-D-arabinofuranosyl) cytosine, N⁴-valeryl-1-(5'-O-triphenylmethyl-β-D-arabinofuranosyl)-cytosine, N⁴-hexanoyl-1-(5'-O-triphenylmethyl - β-D-arabinofuranosyl)cytosine, N⁴-octanoyl-1-(5'-O-triphenylmethyl-β-D-arabinofuranosyl)cytosine, N⁴-lauroyl - 1 - (5'-O-triphenylmethyl-β-D-arabinofuranosyl)cytosine, N⁴-phenylacetyl - 1 - (5'-O-triphenylmethyl-β-D-arabinofuranosyl)cytosine, N² - lauroyl-9-(5'-O-triphenylmethyl-β-D-ribofuranosyl)guanine, N⁶-phenylacetyl-9-(5'-O-triphenylmethyl-β-D-ribofuranosyl)adenine, N⁴-benzoyl - 1-(5'-O-triphenylmethyl-β-D-ribofuranosyl)-3-methylcytosine, N⁴-heptanoyl-1-(5'-O-triphenylmethyl-β-D-ribofuranosyl)5 - methylcytosine, N²-butyryl-9-(5'-O-triphenylmethyl - β - D - ribofuranosyl)guanine, N² - anisoyl -9- (5' - O - triphenylmethyl - β - D - ribofuranosyl)guanine, N⁶ - decanoyl - 9 - [5' - O - (p-methoxyphenyl)diphenylmethyl - β - D - ribofuranosyl]adenine, N⁴ - propionyl-1-[5' - O - (p - methoxyphenyl)diphenyl - β - D-ribofuranosyl]5 - methylcytosine, N⁴ - phenylacetyl - 1 - [5' - O-(p - methoxyphenyl)diphenylmethyl - β - D - deoxyribofuranosyl]3 - methylcytosine, N²,N⁶ - diacetyl - 9 - [5' - O-triphenylmethyl - β- D - deoxyribofuranosyl]2,6 - diaminopurine; N⁶ - phenylpropionyl - 9 - [5' - O - triphenylmethyl -β - D - arabinofuranosyl]7 -deazaadenine, N⁴-hexanoyl - 1 - [5' - O - (p - methoxyphenyl)diphenylmethyl - β - D - ribofuranosyl]5 - hydroxymethylcytosine and the like.

EXAMPLE 2

*1-β-D-deoxyribofuranosylthymin-3'-yl 9-β-D-ribofuranosyl-7-deazaadenin-5'-yl phosphate*

(A) *1 - (5' - O - triphenylmethyl - β - D - deoxyribofuranosyl)thymin - 3' - yl - N⁶ - benzoyl - 9 - (2',3' - isopropylidene-β-D-ribofuranosyl)7-deazaadenin-5'-yl phosphate.*—A mixture of 500 mg. (1 mmole) of N⁶-benzoyl-9 - (2',3' - isopropylidene -β- D-ribofuranosyl)7-deazaadenine 5'-phosphate and 485 mg. (1 mmole of 1-(5'-triphenylmethyl-β-D-deoxyribofuranosyl) thymine [G. Weimann and H. G. Khorana, JACS, 84, 419 (1962)] was dried dried by repeat concentrations under reduced pressure at 30° with specially purified, dry pyridine. Dry air was introduced into the flask, followed by 5 ml. of specially purified dry pyridine and 1.03 g. (5 mmoles) of N,N'-dicyclohexylcarbodiimide. The mixture was shaken in the dark at room temperature (21–25° C.) for 4 days. Water (5 ml.) was added and the mixture stirred for an additional 24 hours. The mixture was filtered and the filtrates concentrated under reduced pressure to a syrup.

A part of the syrup was lyophilized, then redissolved in 5 ml. of acetone. The solution was poured into a colume containing silica gel and chromatographed with ethyl acetate and increasing amounts of Skellysolve B hexanes. The fractions containing the desired product, as determined by paper chromatography were evaporated to give purified 1-(5'-O-triphenylmethyl-β-D-deoxyribofuranosyl)thymin-3' - yl N⁶-benzoyl-9-(2',3'-isopropylidene-β-D-ribofuranosyl)7-deazaadenin-5'-yl phosphate.

(B) *1 - β - D - deoxyribofuranosylthymin-3' - yl 9-β - D - ribofuranosyl - 7 - deazaadenin - 5' - yl phosphate.*—The crude and the purified 1-(5'-O-triphenylmethyl) - β - D - deoxyribofuranosyl)thymin-3'-yl N⁶-benzoyl-9 - (2',3' - isopropylidene - β - D - ribofuranosyl)7-deazaadenin - 5' - yl phosphate were combined and added to a solution of 8 ml. of water, 20 ml. of concentrated ammonium hydroxide and 20 ml. of methanol. The mixture was kept at room temperature overnight and then concentrated to dryness under high vacuum at 30–35° C. to give a residue which was triturated with acetone, and a small amount of N,N'-dicyclohexylurea (90 mg.) was removed by filtration. The filtrate was then concentrated to dryness and treated with 12 ml. of 80% aqueous acetic acid for a period of 2 and ½ days at room temperature to remove the triphenylmethyl and the isopropylidene groups. The mixture was filtered and the filtrate concentrated under reduced pressure at 35° C. to yield a syrup. The syrup was dissolved in 20 ml. of water, the pH adjusted to 8 with 3 N aqueous ammonium hydroxide and the solution extracted with ether. The ether extracts were discarded and the aqueous layer was concentrated to remove dissolved ether. The concentrate was then made up with water to a volume of 25 ml. This amount of solution was chromatographed on a diethylaminoethylcellulose (carbonate form) column of 3 x 51 centimeter dimension, taking fractions of 9 ml. each and diluting gradiently with 2 liters each of 0.02 and 0.125 N-triethylammonium bicarbonate. Fractions 66 through 77 were combined and retreated with 80% aqueous acetic acid at room temperature for a period of 2 days after paper chromatography had shown that the isopropylidene moiety was not quantatively removed from the sample.

The mixture was again filtered and concentrated at reduced pressure to a syrup which was redissolved in water, neutralized with ammonium hydroxide (3 N), extracted with ether, the ether extracts discarded, the solution reduced to a small volume to remove dissolved ether, filtered and evaporated to give 1-β-D-deoxyribofuranosylthymin-3'-yl 9-β-D-ribofuranosyl-7-deazaadenin-5'-yl phosphate as a white solid.

EXAMPLE 3

*1-β-D-deoxyribofuranosylthymin-3'-yl N⁶-benzoyl-9-β-D-ribofuranosyl-7-deazaadenin-5'-yl phosphate*

A one gram portion of 1-(5'-O-triphenylmethyl-β-D-deoxyribofuranosyl)thymin-3'-yl N⁶-benzoyl-9-(2',3'-isopropylidene-β-D-ribofuranosyl)7-deazaadenin-5'-yl phosphate was treated with 80% aqueous acetic acid for a period of 4 days at room temperature. The thus-obtained mixture was filtered and concentrated under reduced pressure at 35° to yield a syrupy material. The syrup was dissolved in water, neutralized with ammonium hydroxide (2 N), extracted with ether, the ether extracts discarded, the solution reduced to a small volume to remove dissolved ether, filtered and evaporated to give 1-β-D-deoxyribofuranosylthymin - 3' - yl N⁶-benzoyl-9-β-D-ribofuranosyl-7-deazaadenin-5'-yl phosphate.

EXAMPLE 4

*1-β-D-arabinofuranosylcytosin-2'-yl 9-β-D-ribofuranosyl-7-deazaadenin-5'-yl phosphate and 1-β-D-arabinofuranosylcytosin-3' - yl 9-β-D-ribofuranosyl-7-deazaadenin-5'-yl phosphate*

In the manner given in Example 2A, N⁶-benzoyl-9-(2',3'-O-isopropylidene-β-D-ribofuranosyl)7 - deazaadenine-5'-phosphate was condensed with N⁴-benzoyl-1-(5'-O-triphenylmethyl-β-D-arabinofuranosyl)cytosine in the presence of N,N'-dicyclohexylcarbodiimide to give N⁴-benzoyl-1-(5'-O-triphenylmethyl-β - D-arabinofuranosyl)cytosin-2'-yl N⁶-benzoyl-9-(2',3'-O-isopropylidene-β-D-ribofuranosyl)7-deazaadenin-5'-yl phosphate and N⁴-benzoyl-1-(5'-O-triphenylmethyl-β - D - arabinofuranosyl)cytosin-3'-yl N⁶-benzoyl-9-(2',3'-O-isopropylidine-β-D-ribofuranosyl)7-deazaadenin-5'-yl phosphate.

The thus-obtained mixture was hydrolyzed as in Example 2B first with aqueous methanol containing ammonia and then with aqueous acetic acid to give a mixture of 1-β-D-arabinofuranosylcytosin-2' - yl 9-β-D-ribofuranosyl-7-deazaadenin-5'-yl phosphate and 1-β-D-arabinofuranosylcytosin-3'-yl 9-β-D-ribofuranosyl-7-deazaadenin-5'-yl phosphate which were separated by chromatography.

EXAMPLE 5

*N⁴-benzoyl-1-β-D-arabinofuranosyl - 3 - methylcytosin-2'-yl N⁶-benzoyl-9-β-D-ribofuranosyl-7-deazaadenin-5'-yl phosphate and N⁴-benzoyl-1-β-D - arabinofuranosyl-3-methylcytosin-3'-yl N⁶-benzoyl-9-β-D-ribofuranosyl-7-deazaadenin-5'-yl phosphate*

In the manner given in Example 2A, N⁶-benzoyl-9-(2',3'-O-isopropylidene-β-D-ribofuranosyl)7 - deazaadenine-5'-phosphate was condensed with N⁴-benzoyl-1-(5'-O-triphenylmethyl-β-D-arabinofuranosyl)3 - methylcytosine in the presence of N,N'-dicyclohexylcarbodiimide to give N⁴-benzoyl-1-(5'-O-triphenylmethyl-β - D - arabinofuranosyl)-3 - methylcytosin - 2' - yl N₆-benzoyl-9-(2',3'-O-isopropylidene-β-D-ribofuranosyl)7-deazaadenin-5'-yl phosphate and N₆-benzyl-1-(5-O-triphenylmethyl-β-D-arabinofuranosyl)-3-methylcytosin-3'-yl N⁶ -benzoyl-9-(2',3'-O-isopropylidene-β - D - ribofuranosyl)7 - deazaadenin-5'-yl phosphate.

The thus-obtained mixture was hydrolyzed as in Example 3 but with aqueous acetic acid only to give a mixture of N⁴-benzoyl - 1 - β-D - arabinofuranosyl-3-methylcytosin-2'-yl N⁶-benzoyl-9-β-D-ribofuranosyl - 7 - deazaadenin-5'-yl phosphate and N⁴-benzoyl - 1 - β - D-arabinofuranosyl - 3 - methylcytosin-3'-yl N⁶-benzoyl-9-β-D-ribofuranosyl-7-deazaadenin-5'-yl phosphate which were separated by chromatography.

EXAMPLE 6

*1-β-D-ribofuranosyl-5-trifluoromethyluracil-2' - yl 9-β-D-ribofuranosyl-7-deazaadenin-5'-yl phosphate and 1-β-D-ribofuranosyl-5-trifluoromethyluracil-3'-yl 9-β-D-ribofuranosyl-7-deazaadenin-5'-yl phosphate*

In the manner given in Example 2A, N⁶-benzoyl-9-(2',3'-O-isopropylidene-β-D-ribofuranosyl)7 - deazaadenine 5'-phosphate was condensed with 1-(5'-O-triphenylmethyl-β-D-ribofuranosyl)-5-trifluoromethyluracil in the presence of N,N'-dicyclohexylcarbodiimide to give 1-(5'-O-triphenylmethyl - β - D - ribofuranosyl) - 5 - trifluoromethyluracil-2'-yl N⁶ - benzoyl-9(2',3'-O-isopropylidene-β-D-ribofuranosyl)7-deazaadenin-5'-yl phosphate and 1-5'-O-triphenylmethyl - β - D - ribofuranosyl)5 - trifluoromethyluracil-3'-yl N⁶ - benzoyl-9(2',3'-O-isopropylidene-β-D-ribofuranosyl)7-deazaadenin-5'-yl phosphate.

The thus-obtained mixture was hydrolyzed as in Example 2B first with aqueous methanol containing ammonia and then with aqueous acetic acid to give a mixture of 1-β-D-ribofuranosyl-5-trifluoromethyluracil-2'-yl 9-β-D-ribofuranosyl-7-deazaadenin-5'-yl phosphate and 1-β - D - ribofuranosyl 5-trifluoromethyluracil-3'-yl 9-β-D-ribofuranosyl-7-deazaadenin-5'-yl phosphate which were separated by chromatography.

EXAMPLE 7

*9-β-D-deoxyribofuranosyl-2,6-diaminopurin - 3'-yl 9-β-D-ribofuranosyl-7-deazaadenin-5'-yl phosphate and N²,N⁶-diacetyl-9-β-D-deoxyribofuranosyl - 2,6-diaminopurin-3'-yl N⁶-benzoyl-9-β-D-ribofuranosyl-7-deazaadenin-5'-yl phosphate*

In the manner given in Example 2A, N⁶-benzoyl-9-(2',3'-O-isopropylidine-β-D-ribofuranosyl)7 - deazaadenine 5'-phosphate was condensed with N²,N⁶-diacetyl-9-(5'-O-triphenylmethyl - β - D - deoxyribofuranosyl)2,6-diaminopurine in the presence of N,N'-di-cyclohexylcarbodiimide to give N²,N⁶-diacetyl - 9 - (5' - O - triphenylmethyl-β-D-deoxyribofuranosyl)2,6-diaminopurin - 3'-yl N⁶ - benzoyl-9-(2',3', - O - isopropylidene-β-D-ribofuranosyl)7-deazaadenin-5'-yl phosphate.

The thus-obtained product was hydrolyzed as in Example 2B first with aqueous methanol containing ammonia and then with aqueous acetic acid to give 9-β-D-deoxyribofuranosyl-2,6-diaminopurin - 3' - yl 9-β-D-ribofuranosyl-7-deazaadenin-5'-yl phosphate.

Hydrolyzing N²,N⁶-diacetyl - 9 - (5'-triphenylmethyl-β-D-deoxyribofuranosyl)2,6-diaminopurin - 3' - yl N⁶-benzoyl-9-(2',3'-di - O - isopropylidene-β-D-ribofuranosyl)7-deazaadenin-5'-yl phosphate in the manner described in Example 3 using aqueous acetic acid only gave N²,N⁶-diacetyl-9-β-D-deoxyribofuranosyl-2,6 - diaminopurin-3'-yl N⁶-benzoyl-9 - β - D-ribofuranosyl-7-deazaadenin-5'-yl phosphate.

EXAMPLE 8

*9-β-D-ribofuranosyl - 7 - deazaadenin - 2' - yl 9-β-D-ribofuranosyl - 7 - deazaadenin - 5'-yl phosphate and 9-β-D-ribofuranosyl-7-deazaadenin - 3' - yl 9-β-D-ribofuranosyl-7-deazaadenin-5'-yl phosphate*

In the manner given in Example 2A, N⁶-benzoyl-9-(2'-3'-O-isopropylidene - β - D - ribofuranosyl)7-deazaadenine 5'-phosphate was condensed with N⁶-benzoyl-9-(5'-O-triphenylmethyl-β-D-ribofuranosyl)7 - deazaadenine in the presence of N,N'-dicyclohexylcarbodiimide to give N⁶-benzoyl-9-(5'-O-triphenylmethyl - β - D - ribofuranosyl) 7-deazaadenin-2'-yl N⁶-benzoyl-9-(2',3' - O - isopropylidene - β - D - ribofuranosyl)7 - deazaadenin -5'-yl phosphate and N⁶-benzoyl-9-(5' - O - triphenylmethyl-β - D-ribofuranosyl)7 - deazaadenine - 3' - yl N⁶-benzoyl-9-(2'-3'-O-isopropylidene-β-D - ribofuranosyl)7 - deazaadenin-5'-yl phosphate.

The thus-obtained mixture was hydrolyzed as in Example 2B first with aqueous methanol containing ammonia and then with aqueous acetic acid to give a mixture of 9-β-D-ribofuranosyl - 7 - deazaadenin-2'-yl 9-β-D-ribofuranosyl-7-deazaadenin-5'-yl phosphate and 9-β-D-ribofuranosyl-7-deazaadenin-3'-yl 9-β-D-ribofuranosyl-7-deazaadenin-5'-yl phosphate which were separated from each other by chromatography.

EXAMPLE 9

*9-β-D-deoxyribofuranosyl-6-mercaptopurin-3'-yl 9-β-D-ribofuranosyl-7-deazaadenin-5'-yl phosphate*

In the manner given in Example 2A, $N^6$-benzoyl-9-(2',3'-O-isopropylidene - β - D-ribofuranosyl-7-deazaadenine 5'-phosphate was condensed with 9 - (5' - O - triphenylmethyl-β-D-deoxyribofuranosyl-6-mercaptopurine in the presence of N,N'-dicyclohexylcarbodiimide to give 9-(5' - O - triphenylmethyl-β-D-deoxyribofuranosyl) - 6-mercaptopurin-3'-yl $N^6$-benzoyl - 9 - (2',3'-O-isopropylidene-β-D-ribofuranosyl)7-deazaadenin-5'-yl phosphate.

The thus-obtained product was hydrolyzed as in Example 2B first with aqueous methanol containing ammonia and then with aqueous acetic acid to give 9-β-D-deoxyribofuranosyl-6-mercaptopurin-3'-yl 9-β-D-ribofuranosyl-7-deazaadenin-5'-yl phosphate.

EXAMPLE 10

*9-β-D-arabinofuranosylguanin-2' - yl - 9 - β-D-ribofuranosyl-7-deazaadenin - 5' - yl phosphate and 9-β-D-arabinofuranosylguanin-3'-yl 9-β-D-ribofuranosyl-7- deazaadenin-5'-yl phosphate*

In the manner given in Example 2A, $N^6$-benzoyl-9-(2',3' - O - isopropylidene-β-D-ribofuranosyl)7-deazaadenine 5'-phosphate was condensed with $N^2$-benzoyl-9-(5'-O-triphenylmethyl - β - D-arabinofuranosyl)guanine in the presence of N,N'-dicyclohexylcarbodiimide to give $N^2$-benzoyl - 9 - (5'-O-triphenylmethyl - β - D - arabinofuranosyl)guanin - 2' - yl $N^6$ - benzoyl - 9 - (2',3'-O-isopropylidene-β-D-ribofuranosyl)7-deazaadenin - 5' - yl phosphate and $N^2$-benzoyl-9-(5' - O - triphenylmethyl-β-D-arabinofuranosyl)guanin-3' - yl $N^6$ - benzoyl - 9 - (2',3'-O-isopropylidene-β-D-ribofuranosyl)7 - deazaadenin-5-yl phosphate.

The thus-obtained mixture was hydrolyzed as in Example 2B first with aqueous methanol containing ammonia and then with aqueous acetic acid to give a mixture of 9-β-D-arabinofuranosylguanin - 2'-yl 9-β-D-ribofuranosyl-7-deazaadenin - 5' - yl phosphate and 9-β-D-arabinofuranosylguanin-3'-yl 9-β-D-ribofuranosyl - 7 - deazaadenin-5'-yl phosphate which were separated by chromatography.

EXAMPLE 11

*9-β-D-deoxyribofuranosylhypoxanthin-3'-yl 9-β-D-ribofuranosyl-7-deazaadenin-5'-yl phosphate*

In the manner given in Example 2A, $N^6$-benzoyl-9-(2',3'-O-isopropylidene - β - D - ribofurnaosyl)7-deazaadenine 5' - phosphate was condensed with 9[5'-O-(p-methoxyphenyl) - diphenylmethyl-β-D-arabinofuranosyl]hypoxanthine in the presence of N,N'-dicyclohexylcarbodiimide to give 9-[5'-O-(p-methoxyphenyl)diphenylmethyl-β-D-arabinofuranosyl]hypoxanthin - 3' - yl $N^6$-benzoyl-9-(2',3' - O - isopropylidene-β-D-ribofuranosyl)7-deazaadenin-5'-yl phosphate.

The thus-obtained product was hydrolyzed as in Example 2B first with aqueous methanol containing ammonia and then with aqueous acetic acid to give 9-β-D-deoxyribofuranosylhypoxanthin-3' - yl 9 - β - D-ribofuranosyl-7-deazaadenin-5'-yl phosphate.

EXAMPLE 12

*1 - β - D - arabinofuranosylcytosin - 2' - yl 9-β-D-ribofuranosyl - 7 - deazapurin-5'-yl phosphate and 1-β-D-arabinofuranosylcytosin - 3'-yl 9-β-D-ribofuranosyl-7-deazapurin-5'-yl phosphate*

In the manner given in Example 2A, 9-(2',3' - O - isopropylidene-β-D-ribofuranosyl)7 - deazapurine 5' - phosphate was condensed with $N^4$-benzoyl-1-(5'-O-triphenylmethyl - β - D - arabinofuranosyl)cytosine in the presence of N,N'-dicyclohexylcarbodiimide to give $N^4$-benzoyl-1-(5' - O - triphenylmethyl-β-D-arabinofuranosyl)cytosin-2'-yl 9-(2',3' - O - isopropylidene-β-D-ribofuranosyl)7-deazapurin-5'-yl phosphate and $N^4$- benzoyl - 1 - (5'-O-triphenylmethyl-β-D - arabinofuranosyl)cytosin - 3' - yl 9-(2',3' - O - isopropylidene - β - D - ribofuranosyl)7-deazapurin-5'-yl phosphate.

The thus-obtained mixture was hydrolyzed as in Example 2B first with aqueous methanol containing ammonia and then with aqueous acetic acid to give a mixture of 1-β-D-arabinofuranosylcytosin - 2'-yl 9-β-D-ribofuranosyl - 7 - deazapurin-5'-yl phosphate and 1-β-D-arabinofuranosylcytosin-3'-yl 9-β - D - ribofuranosyl-7-deazapurin - 5' - yl phosphate which were separated by chromatography.

EXAMPLE 13

*1 - β - D - ribofuranosyl - 5 - fluorouracil - 2' - yl 9-β-D-ribofuranosyl-6-mercapto-7-deazapurin - 5' - yl phosphate and 1-β-D-ribofuranosyl-5-fluorouracil - 3' - yl 9-β-D-ribofuranosyl-6-mercapto-7-deazapurin - 5' - yl phosphate*

In the manner given in Example 2A, 9-(2',3'-O-isopropylidene-β-D-ribofuranosyl) - 6 - mercapto - 7 - deazapurine 5' - phosphate was condensed with 1-(5'-O-triphenylmethyl-β-D-ribofuranosyl)5-fluorouracil in the presence of N,N' - dicyclohexylcarbodiimide to give 1-(5'-O-triphenylmethyl-β-D-ribofuranosyl)5 - fluorouracil - 2'-yl 9-(2',3' - O - isopropylidene - β - D - ribofuranosyl) 6-mercapto-7-deazapurin-5'-yl phosphate and 1-(5' - O-triphenylmethyl - β - D - ribofuranosyl)5-fluorouracil-3'-yl 9-(2',3'-O-isopropylidene - β - D - ribofuranosyl)6-mercapto-7-deazapurin - 5' - yl phosphate.

The thus-obtained mixture was hydrolyzed as in Example 3 with aqueous acetic acid to give a mixture of 1-β-D-ribofuranosyl - 5 - fluorouracil-2'-yl 9 - β - D-ribofuranosyl-6-mercapto - 7 - deazapurin - 5'-yl phosphate and 1-β-D-ribofuranosyl - 5 - fluorouracil-3' - yl 9 - β - D - ribofuranosyl - 6 - mercapto - 7 - deazapurin-5'-yl phosphate which were separated by chromatography.

EXAMPLE 14

*1 - β - D - ribofuranosyl-5-fluorouracil-2'-yl 9-β-D-ribofuranosyl-6-methylmercapto - 7 - deazapurin - 5'-yl phosphate and 1-β-D-ribofuranosyl - 5 - fluorouracil-3'-yl - 9 - β - D-ribofuranosyl-6-methylmercapto - 7-deazapurin-5'-yl phosphate*

In the manner given in Example 2A, 9-(2',3'-O-isopropylidene-β-D-ribofuranosyl) - 6 - methylmercapto-7-deazapurine 5'-phosphate was condensed with 1-(5'-O-triphenylmethyl-β-D-ribofuranosyl)-5-fluorouracil in the presence of N,N'-dicyclohexylcarbodiimide to give 1-(5'-O-triphenylmethyl-β-D-ribofuranosyl)5 - fluorouracil - 2'-yl 9-(2',3' - O - isopropylidene - β - D-ribofuranosyl)6-methylmercapto-7-deazapurin - 5' - yl phosphate and 1-(5'-O-triphenylmethyl - β - D - ribofuranosyl)5-fluorouracil - 3' - yl 9-(2',3'-O-isopropylidene-β-D-ribofuranosyl)6-methylmercapto-7-deazapurin - 5' - yl phosphate.

The thus-obtained mixture was hydrolyzed as in Example 2B with aqueous acetic acid to give a mixture of 1-β-D-ribofuranosyl - 5 - fluorouracil - 2'-yl 9-β-D-ribofuranosyl - 6 - methylmercapto-7-deazapurin-5'-yl phosphate and 1-β-D-ribofuranosyl - 5 - fluorouracil - 3'-yl 9-β-D-ribofuranosyl-6-methylmercapto-7-deazapurin - 5'-yl phosphate which were separated by chromatography.

EXAMPLE 15

*9-β-D-deoxyribofuranosylguanin-3'-yl 9-β-D-ribofuranosyl-6-hydroxy-7-deazapurin-5'-yl phosphate*

In the manner given in Example 2A, 9-(2',3'-O-isopropylidene-β-D-ribofuranosyl)6 - hydroxy-7-deazapurine 5'-phosphate was condensed with N²-acetyl-9-(5'-O-triphenylmethyl-β - D - deoxyribofuranosyl)guanine in the presence of N,N'-dicyclohexylcarbodiimide to give N²-acetyl-9-(5'-O-triphenylmethyl-β-D-deoxyribofuranosyl)-guanin-3'-yl 9 - (2',3'-O-isopropylidene-β-D-ribofuranosyl)-6-hydroxy-7-deazapurin-5'-yl phosphate.

The thus-obtained product was hydrolyzed as in Example 2B first with aqueous methanol containing ammonia and then with aqueous acetic acid to give 9-β-D-deoxyribofuranosylguanin-3'-yl 9-β-D-ribofuranosyl-6-hydroxy-7-dezapurin-5'-yl phosphate.

EXAMPLE 16

*1-β-D-deoxyribofuranosylthymin-3'-yl 9-β-D-ribofuranosyl-6-hydroxy-7-deazapurin-5'-yl phosphate*

In the manner given in Example 2A, 9-(2',3'-O-isopropylidene-β-D-ribofuranosyl)6 - hydroxy-7-deazapurine 5'-phosphate was condensed with 1-(5'-O-triphenylmethyl-β-D-deoxyribofuranosyl)-thymine in the presence of N,N'-dicyclohexylcarbodiimide to give 1-(5'-O-triphenylmethyl-β-D-deoxyribofuranosyl)thymin-3'-yl 9-(2',3'-O-isopropylidene-β-D-ribofuranosyl)6-hydroxy - 7 - deazapurin-5'-yl phosphate.

The thus-obtained product was hydrolyzed as in Example 3 with aqueous acetic acid to give 1-β-D-deoxyribofuranosylthymin-3'-yl 9-β-D-ribofuranosyl-6-hydroxy-7-deazapurin-5'-yl phosphate.

In the manner given in Examples 2A and B or if no acylamino group is present 2A and 3 other 3',5' and/or 2',5' dinucleoside phosphates of Formula IVa, IVb, IVc and IVd in which one of the nucleoside moieties is a 9-β-D-ribofuranosyl-7-deazapurine 5'-phosphoric acid radical can be synthesized. Representative compounds, thus-obtained, include:

1-β-D-ribofuranosyluracil-2'-yl 9-β-D-ribofuranosyl-7-deazaadenin-5'-yl phosphate;
1-β-D-ribofuranosyluracil-3'-yl 9-β-D-ribofuranosyl-7-deazaadenin-5'-yl phosphate;
1-β-D-deoxyribofuranosyluracil-3'-yl 9-β-D-ribofuranosyl-7-deazaadenin-5'-yl phosphate;
1-β-D-arabinofuranosyl-5-fluorouracil-2'-yl 9-β-D-ribofuranosyl-7-deazaadenin-5'-yl phosphate;
1-β-D-arabinofuranosyl-5-fluorouracil-3'-yl 9-β-D-ribofuranosyl-7-deazaadenin-5'-yl phosphate;
9-β-D-arabinofuranosyladenin-2'-yl 9-β-D-ribofuranosyl-7-deazaadenin-5'-yl phosphate;
9-β-D-arabinofuranosyladenin-3'-yl 9-β-D-ribofuranosyl-7-deazaadenin 5'-yl phosphate;
1-β-D-deoxyribofuranosyl-5-bromouracil-2'-yl 9-β-D-ribofuranosyl-7-deazaadenin-5'-yl phosphate;
1-β-D-deoxyribofuranosyl-5-methylcytosin-3'-yl 9-β-D-ribofuranosyl-7-deazaadenin-5'-yl phosphate;
1-β-D-deoxyribofuranosyl-5-methylcytosin-3'-yl 9-β-D-ribofuranosyl-7-deazaadenin-5'-yl phosphate;
9-β-D-ribofuranosylxanthin-2'-yl 9-β-D-ribofuranosyl-7-deazaadenin-5'-yl phosphate;
9-β-D-ribofuranosyl-xanthin-3'-yl 9-β-D-ribofuranosyl-7-deazaadenin-5'-yl phosphate;
9-β-D-ribofuranosyl-2,6-diaminopurin-2'-yl 9-β-D-ribofuranosyl-7-deazaadenin-5'-yl phosphate;
9-β-D-ribofuranosyl-2,6-diaminopurin-3'-yl 9-β-D-ribofuranosyl-7-deazaadenin-5'-yl phosphate;
1-β-D-ribofuranosyl-5-hydroxymethylcytosin-2'-yl 9-β-D-ribofuranosyl-7-deazaadenin-5'-yl phosphate;
1-β-D-ribofuranosyl-5-hydroxymethylcytosin-3'-yl 9-β-D-ribofuranosyl-7-deazaadenin-5'-yl phosphate;
1-β-D-ribofuranosyl-5-iodouracil-2'-yl 9-β-D-ribofuranosyl-6-hydroxy-7-deazapurin-5'-yl phosphate;
1-β-D-ribofuranosyl-5-iodouracil-3'-yl 9-β-D-ribofuranosyl-6-hydroxy-7-deazapurin-5'-yl phosphate;
1-β-D-ribofuranosyl-7-deazaadenin-2'-yl 9-β-D-ribofuranosyl-6-hydroxy-7-deazapurin-5'-yl phosphate;
1-β-D-ribofuranosyl-7-deazaadenin-3'-yl 9-β-D-ribofuranosyl-6-hydroxy-7-deazapurin-5'-yl phosphate;
9-β-D-deoxyribofuranosylguanin-3'-yl 9-β-D-ribofuranosyl-6-hydroxy-7-deazapurin-5'-yl phosphate;
9-β-D-arabinofuranosyl-6-mercaptopurin-2'-yl 9-β-D-ribofuranosyl-6-hydroxy-7-deazapurin-5'-yl phosphate;
9-β-D-arabinofuranosyl-6-mercaptopurin-3'-yl 9-β-D-ribofuranosyl-6-hydroxy-7-deazapurin-5'-yl phosphate;
9-β-D-arabinofuranosyl-6-mercapto-7-deazapurin-2'-yl 9-β-D-ribofuranosyl-6-hydroxy-7-deazapurin-5'-yl phosphate;
9-β-D-arabinofuranosyl-6-mercapto-7-deazapurin-3'-yl 9-β-D-ribofuranosyl-6-hydroxy-7-deazapurin-5'-yl phosphate;
1-β-D-arabinofuranosylcytosin-2'-yl 9-β-D-ribofuranosyl-7-deazapurin-5'-yl phosphate;
1-β-D-arabinofuranosylcytosin-3'-yl 9-β-D-ribofuranosyl-7-deazapurin-5'-yl phosphate;
1-β-D-arabinofuranosyl-3-methylcytosin-2'-yl 9-β-D-ribofuranosyl-7-deazapurin-5'-yl phosphate;
1-β-D-arabinofuranosyl-3-methylcytosin-3'-yl 9-β-D-ribofuranosyl-7-deazapurin-5'-yl phosphate;
9-β-D-ribofuranosyladenin-2'-yl 9-β-D-ribofuranosyl-7-deazapurin-5'-yl phosphate;
9-β-D-ribofuranosyladenin-3'-yl 9-β-D-ribofuranosyl-7-deazapurin-5'-yl phosphate;
9-β-D-deoxyribofuranosyl-7-deazaadenine-3'-yl 9-β-D-ribofuranosyl-7-deazapurin-5'-yl phosphate;
1-β-D-deoxyribofuranosyl-5-chlorouracil-3'-yl 9-β-D-ribofuranosyl-7-deazapurin-5'-yl phosphate;
1-β-D-ribofuranosyl-5-methyluracil-2'-yl 9-β-D-ribofuranosyl-6-mercapto-7-deazapurin-5'-yl phosphate;
1-β-D-ribofuranosyl-5-methyluracil-3'-yl 9-β-D-ribofuranosyl-6-mercapto-7-deazapurin-5'-yl phosphate;
9-β-D-ribofuranosyladenin-2'-yl 9-β-D-ribofuranosyl-6-mercapto-7-deazapurin-5'-yl phosphate;
9-β-D-ribofuranosyladenin-3'-yl 9-β-D-ribofuranosyl-6-mercapto-7-deazapurin-5'-yl phosphate;
1-β-D-arabinofuranosyl-5-hydroxymethyl-2'-yl 9-β-D-ribofuranosyl-6-mercapto-7-deazapurin-5'-yl phosphate;
1-β-D-arabinofuranosyl-5-hydroxymethyl-3'-yl 9-β-D-ribofuranosyl-6-mercapto-7-deazapurin-5'-yl phosphate;
9-β-D-deoxyribofuranosylhypoxanthin-3'-yl 9-β-D-ribofuranosyl-6-methylmercapto-7-deazapurin-5'-yl phosphate;
9-β-D-deoxyribofuranosyl-7-deazaadenin-3'-yl 9-β-D-ribofuranosyl-6-methylmercapto-7-deazapurin-5'-yl phosphate;
1-β-D-ribofuranosyluracil-2'-yl 9-β-D-ribofuranosyl-6-methylmercapto-7-deazapurin-5'-yl phosphate;
1-β-D-ribofuranosyluracil-3'-yl 9-β-D-ribofuranosyl-6-methylmercapto-7-deazapurin-5'-yl phosphate;
N²-anisoyl-9-β-D-ribofuranosylguanin-2'-yl N⁶-benzoyl-9-β-D-ribofuranosyl-7-deazaadenin-5'-yl phosphate;
N²-anisoyl-9-β-D-ribofuranosylguanin-3'-yl N⁶-benzoyl-9-β-D-ribofuranosyl-7-deazaadenin-5'-yl phosphate;
N⁴-phenylacetyl-1-β-D-deoxyribofuranosyl-5-methylcytosin-3'-yl N⁶-lauroyl-9-β-D-ribofuranosyl-7-deazaadenin-5'-yl phosphate;
N⁴-(β-cyclopentylpropionyl)-1-β-D-deoxyribofuranosylcytosin-3'-yl 9-β-D-ribofuranosyl-6-methylmercapto-7-deazapurin-5'-yl phosphate;
N⁴-butyryl-9-β-D-ribofuranosyladenin-2'-yl 9-β-D-ribofuranosyl-7-deazapurin-5'-yl phosphate;
N⁴-butyryl-9-β-D-ribofuranosyladenin-3'-yl 9-β-D-ribofuranosyl-7-deazapurin-5'-yl phosphate;
N²,N⁶-bis-phenylpropionyl-9-β-D-deoxyribofuranosyl-2,6-diaminopurin-3'-yl N⁶-decanoyl-9-β-D-ribofuranosyl-7-deazaadenin-5'-yl phosphate,
and the like.

I claim:
1. A dinucleoside phosphate selected from the group consisting of 3',5'- and 2',5'-dinucleoside phosphates of the formulae:

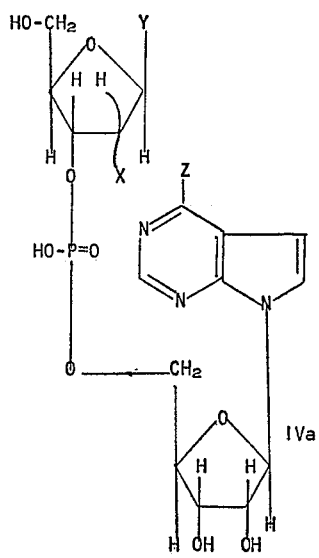 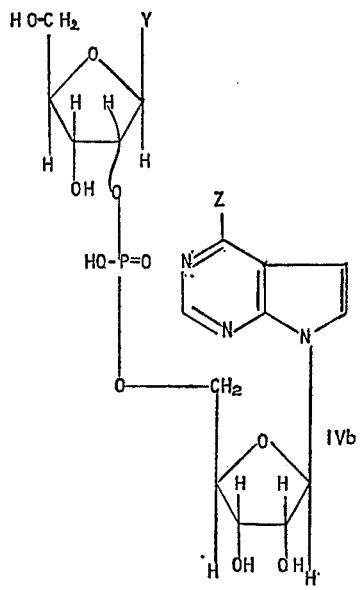

wherein X is selected from the group consisting of hydrogen, α-hydroxy and β-hydroxy, wherein Z is selected from the group consisting of hydrogen, hydroxy, amino, acylamino, in which the acyl group is of a hydrocarbon carboxylic acid containing from 2 to 12 carbon atoms, inclusive, or anisoyl mercapto and alkyl mercapto in which the alkyl group has from 1 to 4 carbon atoms, inclusive; wherein Y is selected from the group consisting of cytosin-1-yl, uracil-1-yl, thymin-1-yl, adenin-9-yl, guanin-9-yl, 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyluracil-1-yl, hypoxanthin-9-yl, xanthin-9-yl, 5-methylcytosin-1-yl, 3-methylcytosin-1-yl, 2,6-diaminopurin-9-yl, 5-hydroxymethylcytosin-1-yl, 7-deazaadenin-9-yl, 6-mercapto-7-deazapurin-9-yl, 7-deazahypoxanthin-9-yl and 6-azauracil-1-yl.

2. 1 - β-D-deoxyribofuranosylthymin-3'-yl 9-β-D-ribofuranosyl-7-deazaadenin-5'-yl phosphate.

3. 1 - β - D-arabinofuranosylcytosin-2'-yl 9-β-D-ribofuranosyl-7-deazapurin-5'-yl phosphate.

4. 1 - β - D-arabinofuranosylcytosin-3'-yl 9-β-D-ribofuranosyl-7-deazapurin-5'-yl phosphate.

5. 1 - β - D-arabinofuranosylcytosin-2'-yl 9-β-D-ribofuranosyl-7-deazaadenin-5'-yl phosphate.

6. 1 - β - D-arabinofuranosylcytosin-3'-yl 9-β-D-ribofuranosyl-7-deazaadenin-5'-yl phosphate.

7. 9 - β - D-ribofuranosyl-7-deazaadenin-2'-yl 9-β-D-ribofuranosyl-7-deazaadenin-5'-yl phosphate.

8. 9 - β - D-ribofuranosyl-7-deazaadenin-3'-yl 9-β-D-ribofuranosyl-7-deazaadenin-5'-yl phosphate.

9. A dinucleoside phosphate selected from the group consisting of 3',5'- and 2',5'-dinucleoside phosphates of the formulae:

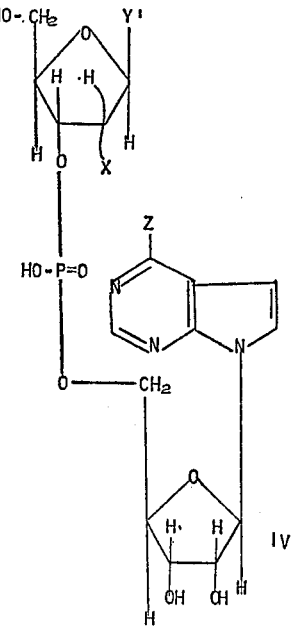 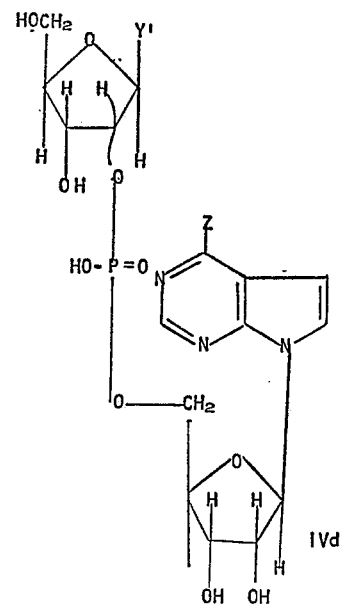

wherein X is selected from the group consisting of hydrogen, α-hydroxy and β-hydroxy, wherein Z is selected from the group consisting of hydrogen, hydroxy, amino, acylamino, in which the acyl group is of a hydrocarbon carboxylic acid consisting from 2 to 12 carbon atoms, inclusive, or anisoyl mercapto and alkylmercapto in which the alkyl group has from 1 to 4 carbon atoms, inclusive; wherein Y' is selected from the group consisting of N⁴-acylcytosin-1-yl, uracil-1-yl, thymin-1-yl, N⁶-acyladenin-9-yl, N²-acylguanin-9-yl, 6-mercaptopurin-9-yl, uracil-3-yl, 5-fluorouracil-1-yl, 5-chlorouracil-1-yl, 5-bromouracil- 1-yl, 5-idoouracil-1-yl, 5-trifluoromethyluracil-1-yl, hypoxanthin-9-yl, xanthin-9-yl, $N^4$-acyl-5-methylcytosin-1-yl, $N^4$-acyl-3-methylcytosin-1-yl, $N^2,N^6$-diacyl-2,6-diaminopurin-9-yl, $N^4$-acyl-5-hydroxymethylcytosin-1-yl, $N^6$-acyl-7-deazaadenin-9-yl, 6-mercapto-7-deazapurin-9-yl, 7-deazahypoxanthin-9-yl and 6-azauracil-1-yl, wherein the acyl group is defined as above.

10. 1 - $\beta$ - D-deoxyribofuranosylthymin-3'-yl $N^6$-benzoyl-9-$\beta$-D-ribofuranosyl-7-deazaadenin-5'-yl phosphate.

11. $N^2,N^6$ - diacetyl - 9-$\beta$-D-deoxyribofuranosyl-2,6-diaminopurin - 3' - yl $N^6$ - benzoyl-9-$\beta$-D-ribofuranosyl-7-deazaadenin-5'-yl phosphate.

12. A compound selected from the dinucleoside phosphates group consisting of dinucleoside phosphates of the formulae:

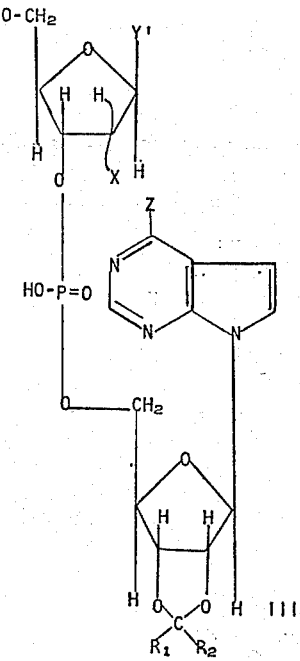
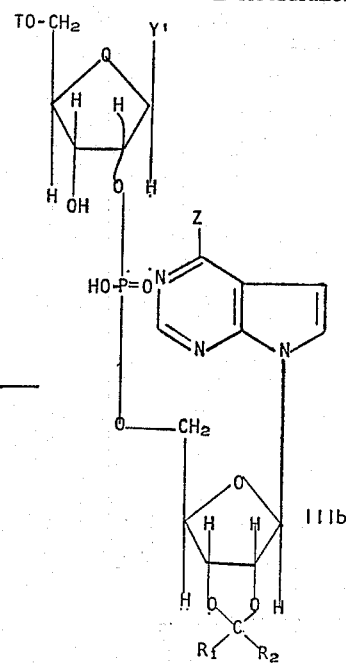

wherein $R_1$ and $R_2$ are alkyl radicals having from 1 to 4 carbon atoms, inclusive, or can form together an alkylene chain of 4 to 6 carbon atoms, inclusive; wherein T is selected from the group consisting of triphenylmethyl, (p-methoxyphenyl)diphenylmethyl and bis($\beta$-methoxyphenyl) phenylmethyl; wherein X is selected from the group consisting of hydrogen, $\alpha$-hydroxy and $\beta$-hydroxy; wherein Z is selected from the group consisting of hydrogen, hydroxy, amino, acylamino, in which the acyl group is of a hydrocarbon carboxylic acid containing from 2 to 12 carbon atoms, inclusive, or anisoyl, mercapto and alkylmercapto in which the alkyl group is defined as above; wherein Y' is selected from the group consisting of $N_4$-acylcytosin-1-yl, uracil-1-yl, thymin-1-yl, $N^6$-acyladenin-9-yl, $N^2$-acylguanin - 9 - yl, 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyluracil-1-yl, hypoxanthin-9-yl, xanthin-9-yl, $N^4$-acyl-5-methylcytosin-1-yl, $N^4$-acyl-3-methylcytosin-1-yl, $N^2,N^6$-diacyl-2,6-diaminopurin-9-yl, $N^4$-acyl-5-hydroxymethylcytosin-1-yl, $N^6$-acyl-7-deazaadenine-9-yl, 6-mercapto-7-deazapurin-9-yl, 7-deazahypoxanthin-9-yl and 6-azauracil-1-yl; in which acyl is defined as above.

13. 1 - (5'-O-triphenylmethyl - $\beta$-D-deoxyribofuranosyl)thymin-3'-yl $N^6$-benzoyl-9-(2',3'-O-isopropylidene-$\beta$-D-ribofuranosyl)7-deazaadenin-5'-yl phosphate.

14. $N^4$ - benzoyl - 1 - (5' - O - triphenylmethyl - $\beta$ - D-ribofuranosyl) cytosin - 2' - yl $N^6$ - benzoyl - (2',3' - O-isopropylidene - $\beta$ - D - ribofuranosyl)7 - deazaadenin-5'-yl phosphate.

15. $N^4$ - benzoyl - 1 - (5' - O - triphenylmethyl - $\beta$ - D-ribofuranosyl) - cytosin - 3' - yl $N^6$ - benzoyl - - (2',3'-O-isopropylidene - $\beta$ - D - ribofuranosyl)7 - deazaadenin-5'-yl phosphate.

16. A process for the production of a dinucleoside phosphate selected from the group consisting of 3',5'- and 2',5' dinucleoside phosphates of the formulae:

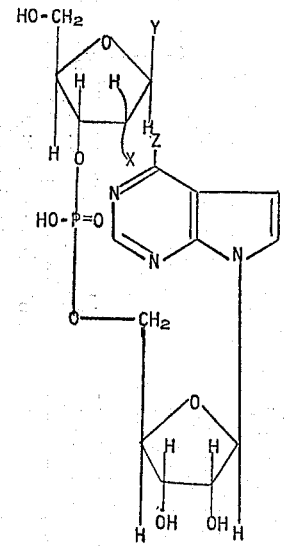
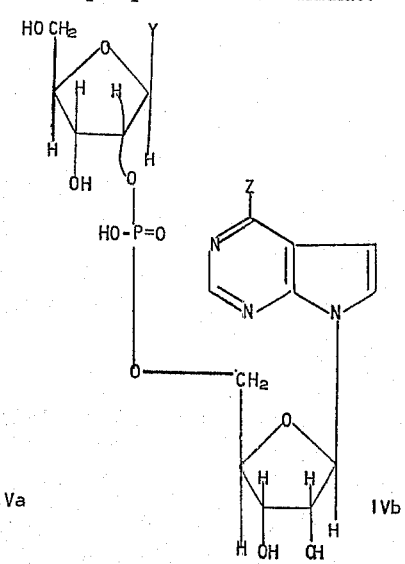

wherein X is selected from the group consisting of hydrogen α-hydroxy and β-hydroxy, wherein Z is selected from the group consisting of hydrogen, hydroxy, amino, acylamine, in which the acyl group is of a hydrocarbon carboxylic acid containing from 2 to 12 carbon atoms, inclusive, and anisoyl, mercapto and alkylmercapto in which the alkyl group has from 1 to 4 carbon atoms, inclusive; wherein Y is selected from the group consisting of cytosin-1-yl, uracil-1-yl, thymin-1-yl, adenin-9-yl, guanin-9-yl, 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyluracil-1-yl, hypoxanthin-9-yl, xanthin-9-yl, 5-methylcytosin-1-yl, 3-methylcytosin-1-yl, 2,6-diaminopurin-9-yl, 5-hydroxymethylcytosin-1-yl, 7-deazaadenin-9-yl, 6-mercapto-7-deazapurin-9-yl, 7-deazahypoxanthin-9-yl and 6-azauracil-1-yl, which comprises: Treating a 7-deazapurin riboside of the formula:

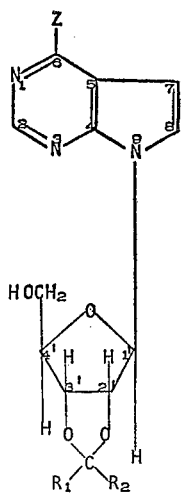

wherein $R_1$ and $R_2$ are alkyl radicals having from 1 to 4 carbon atoms, inclusive, or can form together an alkylene chain of 4 to 6 carbon atoms, inclusive; and wherein Z is defined as above, with a phosphorylating agent in the presence of a condensing agent, and thereafter with an aqueous alkali base to obtain the phosphate of Formula 11:

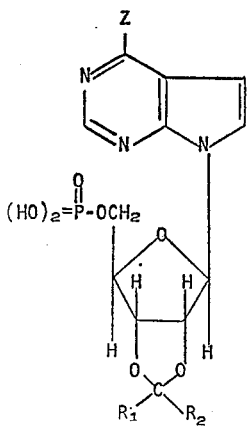

wherein Z, $R_1$ and $R_2$ have the significance of above; condensing compound 11 with a compound selected from the group consisting of compounds Formula X:

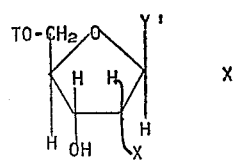

wherein T is selected from the group consisting of triphenylmethyl, (p-methoxyphenyl)diphenylmethyl and bis(β-methoxyphenyl)phenylmethyl; wherein X is defined as above, and wherein Y' signifies a group like Y above in which amino groups capable of acylating are acylated, to give compounds of the formulae:

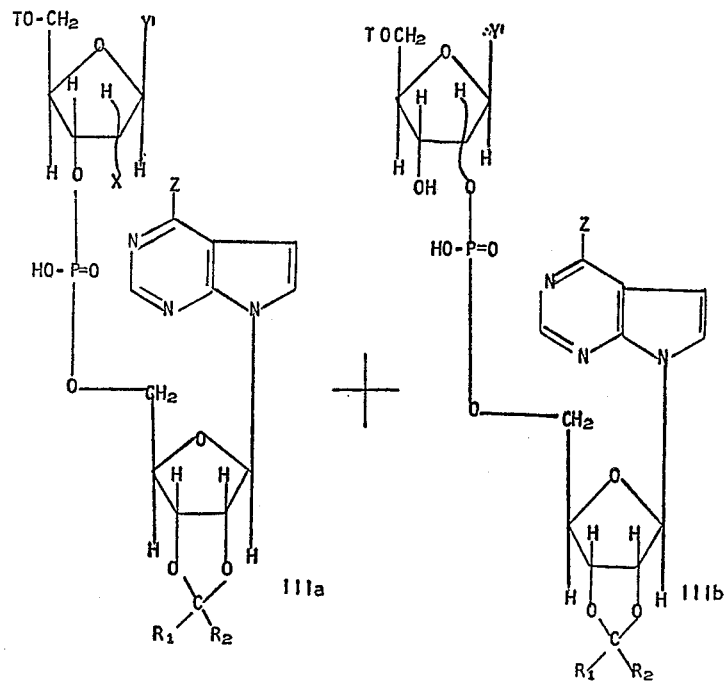

wherein $R_1$, $R_2$, T, X, Y' and Z are defined as above and hydrolyzing the protective groups with an acid and a base to give the compound of Formulae IVa and IVb.

17. A process according to claim 16 wherein the deazapurin riboside employed is N⁶-benzoyl-9-(2',3'-O- isopropylidene-β-D-ribofuranosyl)7-deazaadenine and the compound of formula X is 1-(5'-triphenylmethyl-β-D-deoxyribofuranosyl)thymine to give as product 1-β-D-deoxyribofuranosylthymin-3'-yl 9-β-D-ribofuranosyl-7-deazaadenin-5'-yl phosphate.

18. A process to claim 16 wherein the phosphorylating agent is 2-cyanoethyl phosphate and the condensing agent is N,N'-dicyclohexylcarbodiimide.

19. A process for the production of a dinucleoside phosphate selected from the group consisting of 3',5'- and 2'5' dinucleoside phosphates of the formulae:

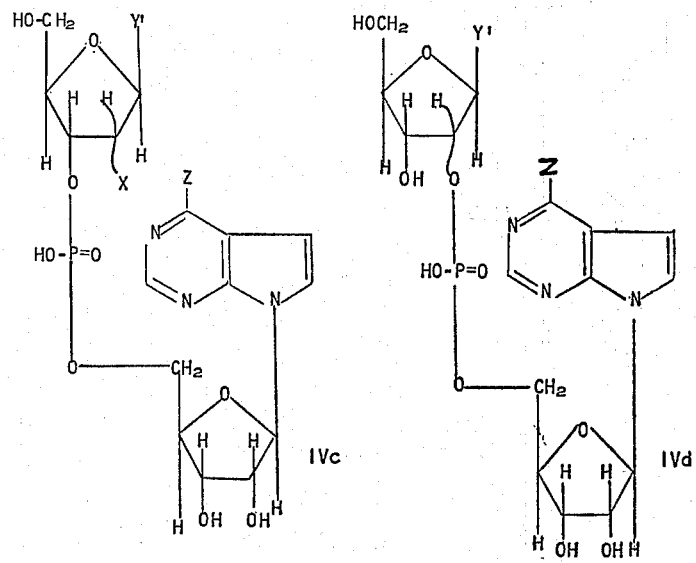

wherein X is selected from the group consisting of hydrogen, α-hydroxy and β-hydroxy, wherein Z is selected from the group consisting of hydrogen, hydroxy, amino, acylamino, in which the acyl group is of a hydrocarbon carboxylic acid containing from 2 to 12 carbon atoms, inclusive, or anisoyl mercapto and alkylmercapto in which the acyl group has from 1 to 4 carbon atoms, inclusive; wherein Y' is selected from the group consisting of N⁴-acylcytosin-1-yl, uracil-1-yl, thymin-1-yl, N⁶-acyladenin-9-yl, N²-acylguanin-9-yl, 6-mercaptopurin-9-yl, uracil-3-yl, 5-fluorouracil-1-yl, 5-chlorouracil-1-yl, 5-bromouracil-1-yl, 5-iodouracil-1-yl, 5-trifluoromethyluracil-1-yl, hypoxanthin-9-yl, xanthin-9-yl, N⁴-acyl-5-methylcytosin-1-yl, N⁴-acyl-3-methylcytosin-1-yl, N²,N⁶-diacyl-2,6-diaminopurin-9-yl, N⁴-acyl-5-hydroxymethylcytosin-1-yl, N⁶-acyl-7-deaza-adenin 9-yl, 6-mercapto-7-deazapurin 9-yl, 7-deazahypoxanthin-9-yl-and 6-azauracil-1-yl, which comprises: Treating a 7-deazapur in riboside of the formula:

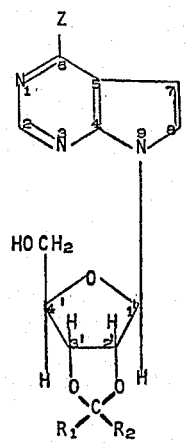

wherein R₁ and R₂ are alkyl radicals having from 1 to 4 carbon atoms, inclusive, or can form together an alkylene chain of 4 to 6 carbon atoms, inclusive; and wherein Z is defined as above, with a phosphorylating agent in the presence of a condensing agent, and thereafter with an aqueous alkali base to obtain the phosphate of Formula II:

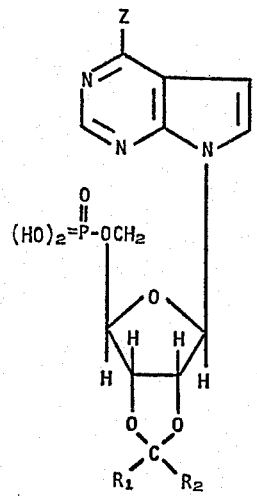

wherein Z and R₁ and R₂ have the significance of above; condensing compound II with a compound selected from the group consisting of compounds of Formula X:

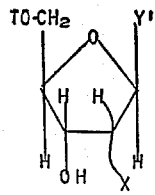

wherein T is selected from the group consisting of triphenylmethyl, (p-methoxyphenyl)diphenylmethyl and bis (β-methoxyphenyl)-phenylmethyl; wherein X is defined as above, and wherein Y' signifies a group like Y above in which amino groups capable of acylating are acylated, to give compounds for the formula:

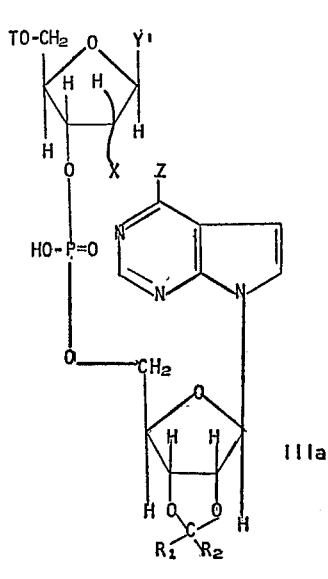 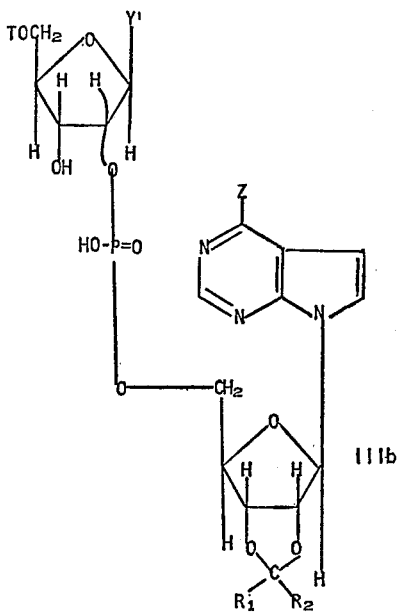

wherein $R_1$, $R_2$, T, X, Y' and Z are defined as above and hydrolyzing with an acid to remove the protective groups and to give the compounds IVc and IVd above.

20. A process according to claim 19 wherein the 7-deazapurin riboside employed is $N^6$-benzoyl-9-(2', 3',-O-isopropylidene-β-D- ribofuranosyl)7-deazaadenine and the compound of Formula X is 1-(5'-triphenylmethyl-β-D-deoxyribofuranosyl)thymine to give as product $N^6$-benzoyl-1-β-D-deoxyribofuranosylthymin-3'-yl 9 - β - D-ribofuranosyl-7-deazaadenin-5'-yl phosphate.

References Cited

Jacob et al, "Chem. Abst.," vol. 57, 1962, pages 15218 to 15219.

LEWIS GOTTS, *Primary Examiner.*

JOHNIE R. BROWN, *Assistant Examiner.*